(12) United States Patent
Abouelseoud

(10) Patent No.: US 10,912,093 B2
(45) Date of Patent: Feb. 2, 2021

(54) SPATIAL LOADING ANNOUNCEMENT IN MMW WLAN NETWORKS

(71) Applicant: SONY CORPORATION, Tokyo (JP)

(72) Inventor: Mohamed Abouelseoud, San Francisco, CA (US)

(73) Assignee: SONY CORPORATION, Tokyo (JP)

( * ) Notice: Subject to any disclaimer, the term of this patent is extended or adjusted under 35 U.S.C. 154(b) by 14 days.

(21) Appl. No.: 16/274,862

(22) Filed: Feb. 13, 2019

(65) Prior Publication Data
US 2020/0112957 A1 Apr. 9, 2020

Related U.S. Application Data

(60) Provisional application No. 62/741,240, filed on Oct. 4, 2018.

(51) Int. Cl.
*H04W 72/04* (2009.01)
*H04W 72/12* (2009.01)
*H04W 84/12* (2009.01)

(52) U.S. Cl.
CPC ....... *H04W 72/0453* (2013.01); *H04W 72/12* (2013.01); *H04W 84/12* (2013.01)

(58) Field of Classification Search
CPC ................................................ H04W 72/0453
See application file for complete search history.

(56) References Cited

U.S. PATENT DOCUMENTS

| 5,649,293 A * | 7/1997 | Reed | H04W 16/06 455/453 |
| 6,330,459 B1 * | 12/2001 | Crichton | H04W 16/28 455/434 |
| 9,178,593 B1 * | 11/2015 | Liu | H04B 7/0834 |
| 2015/0071185 A1 * | 3/2015 | Trainin | H04B 7/0617 370/329 |

(Continued)

FOREIGN PATENT DOCUMENTS

| CN | 108024376 A | 5/2018 |
| WO | 2018049224 A1 | 3/2018 |

(Continued)

OTHER PUBLICATIONS

ISA/EPO, International Search Report and Written Opinion dated Dec. 16, 2019, related PCT international application No. PCT/IB2019/057168, pp. 1-12, claims searched, pp. 13-18.

*Primary Examiner* — John D Blanton
(74) *Attorney, Agent, or Firm* — O'banion & Ritchey LLP; John P. O'Banion

(57) ABSTRACT

A wireless communication apparatus/system/method utilizing directional data transmission over a communication (e.g., mmW) band, which announces statistics about channel use in specific directions and across all directions to other stations. These announcements can be broadcast with network discovery signals, such as DMG beacons or announce frames. The announcements can be broadcasted as channel statistics for each scheduled allocation, and/or as spatial direction statistics in the direction where the carrying frame (Continued)

is sent. These announcements can be added to the extended schedule element allocation field or any other element. The spatial loading element contains the statistics of the spatial loading in all directions and the channel loading statistics across all directions.

23 Claims, 24 Drawing Sheets

(56) References Cited

U.S. PATENT DOCUMENTS

| | | | |
|---|---|---|---|
| 2017/0188404 A1* | 6/2017 | Fodor | H04W 76/14 |
| 2017/0202011 A1 | 7/2017 | Trainin | |
| 2019/0140752 A1* | 5/2019 | Annam | H04L 25/0202 |
| 2019/0268055 A1* | 8/2019 | Li | H04W 16/28 |

FOREIGN PATENT DOCUMENTS

| | | | |
|---|---|---|---|
| WO | 2018147699 A1 | 8/2018 | |
| WO | 2018165554 A1 | 9/2018 | |

* cited by examiner

| Element ID | Length | Active Path Selection Protocol Identifier | Active Path Selection Metric Identifier | Congestion Control Mode Identifier | Synchronization Method Identifier | Authentication Protocol Identifier | Mesh Formation Info | Mesh Capability |
|---|---|---|---|---|---|---|---|---|
| 1 | 1 | 1 | 1 | 1 | 1 | 1 | 1 | 1 |

Octets:

FIG. 4
(Prior Art)

| Frame control | Duration | RA | TA | SSW | SSW Feedback | FCS |
|---|---|---|---|---|---|---|
| Octets: 2 | 2 | 6 | 6 | 3 | 3 | 4 |

FIG. 7
(Prior Art)

| B0 | B1  B9 | B10  B15 | B16  B17 | B18  B23 |
|---|---|---|---|---|
| Direction | CDOWN | Sector ID | DMG Antenna ID | RXSS Length |
| Bits: 1 | 9 | 6 | 2 | 6 |

FIG. 8
(Prior Art)

| B0  B8 | B9  B10 | B11  B15 | B16 | B17  B23 |
|---|---|---|---|---|
| Total sectors in ISS | Number of RX DMG antennas | Reserved | Poll Required | Reserved |
| Bits: 9 | 2 | 5 | 1 | 7 |

FIG. 9A
(Prior Art)

| B0  B5 | B6  B7 | B8  B15 | B16 | B17  B23 |
|---|---|---|---|---|
| Sector select | DMG Antenna select | SNR report | Poll Required | Reserved |
| Bits: 6 | 2 | 8 | 1 | 7 |

FIG. 9B
(Prior Art)

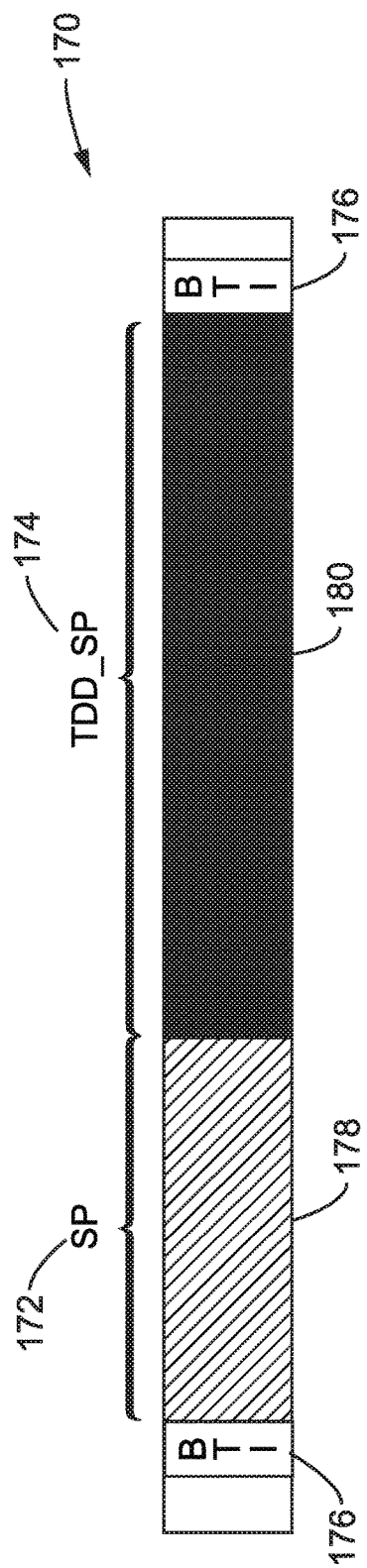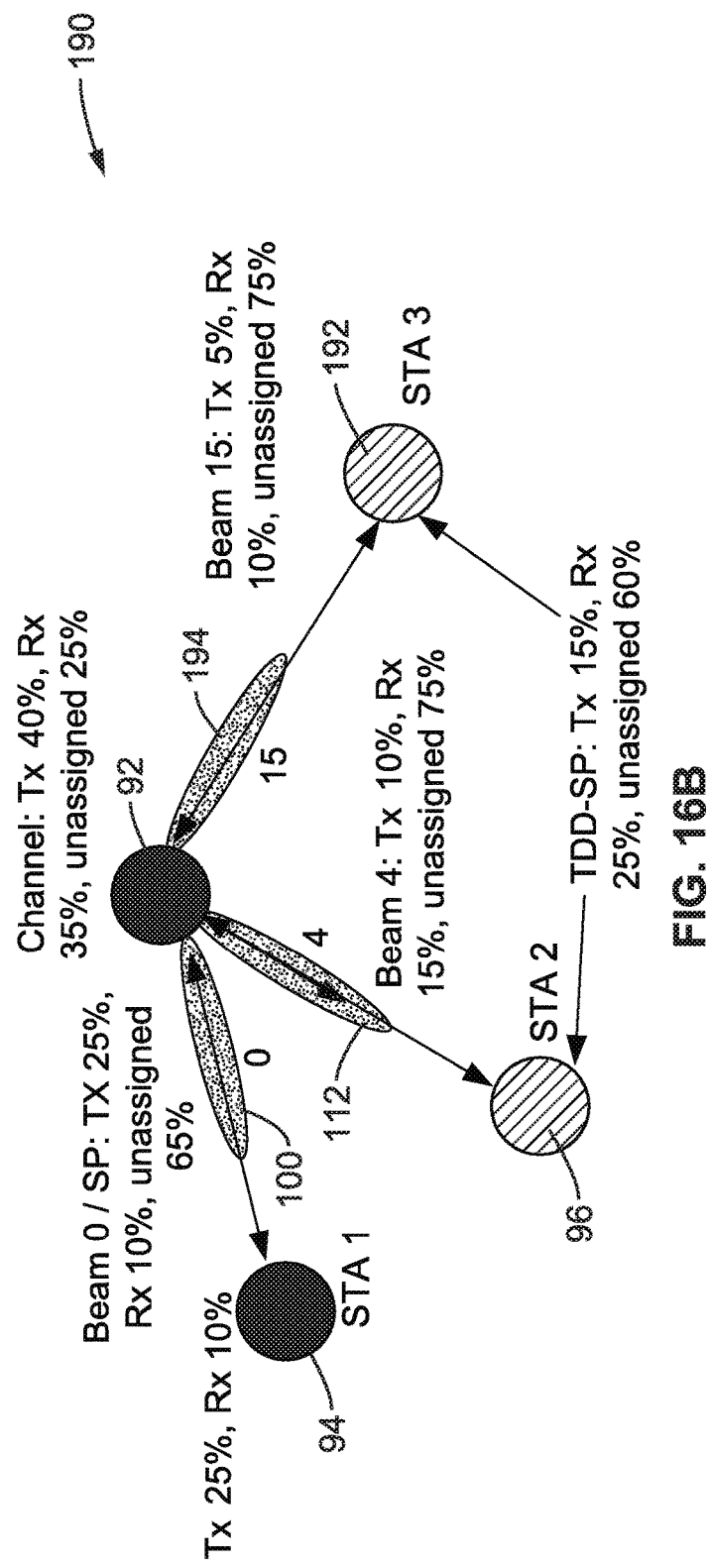

| Tx Statistics | Rx Statistics | Unassigned Statistics |
|---|---|---|
| 8 | 8 | 8 | bits

FIG. 17  ～210

| DMG Antenna ID | Beam ID | Tx Statistics | Rx Statistics | Unassigned Statistics |
|---|---|---|---|---|
| 3 | 8 | 8 | 8 | 8 | bits

FIG. 18  ～220

| Element ID | Length | Element ID Extension | Band ID | Operating class | Channel Number | Number of Spatial Statistics | Spatial Direction 1 | ... | Spatial Direction n | Channel Statistics |
|---|---|---|---|---|---|---|---|---|---|---|

FIG. 19  ～230

| Element ID | Length | Element ID Extension | EDMG Allocation Control | Number of Allocations | Channel Allocation 1 | ... | Channel Allocation N |
|---|---|---|---|---|---|---|---|

FIG. 21 — 250

| Scheduling Type | Channel Aggregation | BW | Asymmetric beamforming | Receive Direction | N STS | Nmax STS | Channel Statistics | Spatial Statistics | Reserved | Allocation |
|---|---|---|---|---|---|---|---|---|---|---|

FIG. 22 — 260

Beacon frame in direction i

Beacon frame in direction i+1

Beacon frame in direction i+2

| Beacon frame | Spatial statistics for direction 1 | ... | Spatial statistics for direction n | Channel loading statistics |

Beacon frame in direction i

FIG. 26A

| Beacon frame | Spatial statistics for direction 1 | ... | Spatial statistics for direction n | Channel loading statistics |

Beacon frame in direction i+1

FIG. 26B

SPATIAL LOADING ANNOUNCEMENT IN MMW WLAN NETWORKS

CROSS-REFERENCE TO RELATED APPLICATIONS

This application claims priority to, and the benefit of, U.S. provisional patent application Ser. No. 62/741,240 filed on Oct. 4, 2018, incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to directional millimeter wave (mmW) wireless network communications, and more particularly to the distribution of spatial loading announcements.

2. Background Discussion

In response to the need of higher capacity, wireless local area networks (WLANs), especially in the millimeter wavelength (mm-Wave or mmW) regimes. Network operators have begun to embrace various concepts to achieve densification, such as in the Millimeter wave (mmW) regime including mesh networks and mixtures of mesh and non-mesh networks, are becoming increasingly important. Current sub-6 GHz wireless technology is not sufficient to cope with high data demands. One alternative is to utilize additional spectrum in the 30-300 GHz band which is often referred to as the millimeter wave band (mmW).

Efficient use of mmW wireless networking systems generally requires properly dealing with channel impairments and propagation characteristics of these high frequency bands. High free-space path loss, high penetration, reflection and diffraction losses reduce available diversity and limit non-line-of-sight (NLOS) communications. Yet, the small wavelength of mmW enables the use of high-gain electronically steerable directional antennas of practical dimensions, which can provide sufficient array gain to overcome path loss and ensure a high Signal-to-Noise Ratio (SNR) at the receiver. Directional distribution networks (DNs) in dense deployment environments using mmW bands could be an efficient way for achieving reliable communications between stations (STAs) and overcoming line-of-sight channel restrictions.

Upon a new station (STA or node) starting up in a location it will be looking (searching) for neighboring STAs to discover in a network to be joined. The process of initial access of a STA to a network comprises scanning for neighboring STAs and discovering all active STAs in the local vicinity. This can be performed either through the new STA searching for a specific network or list of networks to join, or by the new STA sending a broadcast request to join any already established network that will accept the new STA.

A STA connecting to a distributed network (DN) needs to discover neighboring STAs to decide on the best way to reach a gateway/portal DN STAs and the capabilities of each of these neighboring STAs. The new STA examines every channel for possible neighboring STAs over a specific period of time. If no active STA is detected after that specific time, the new STA moves to test the next channel. When a STA is detected, the new STA collects sufficient information to configure its physical (PHY) layer (e.g., OSI model) for operation in the regulatory domain (IEEE, FCC, ETSI, MKK, etc.). This task is further challenging in mmWave communications due to directional transmissions. The challenges in this process can be summarized as: (a) knowledge of surrounding STAs IDs; (b) knowledge of the best transmission pattern(s) for beamforming; (c) channel access issues due to collisions and deafness; and (d) channel impairments due to blockage and reflections. Designing a neighborhood discovery method to overcome some or all of the above is of utmost importance to enable pervasiveness of mmWave D2D and DN technologies.

In present mmWave communication systems STAs using TDD SP channel access have no requirement to listen to the channel before using it, which can create issues for other stations trying to fairly access the channel. These other STAs trying to access the channel might be blocked since they are required to sense the medium before using the channel, while the TDD SP Stations are not required to do so. In addition, the present techniques for sensing the medium are subject to false indications of interference.

However, there is still significant overhead and conflict arising between stations regarding channel usage, which lowers overall network efficiencies.

Accordingly, a need exists for enhanced mechanisms for providing more efficient coexistence between stations within a mmWave directional wireless network. The present disclosure fulfills that need and provides additional benefits over previous technologies.

BRIEF SUMMARY

A wireless protocol is described for directional mmW wireless stations to announce spatial loading, occupancy and/or scheduling information. Current WLANs on 60 GHz announce themselves by transmitting a beacon frame in all directions to the STAs in the surrounding area that are not part of its BSS and to manage STAs in its BSS. STAs in the surrounding area can passively obtain information about the active BSS around them by receiving beacons from other STAs in the area. The beacon contains information about the SSID, synchronization, multi-band, bandwidth and channel list, sleeping and waking up schedule, neighbors report, BSS load and sometimes other scheduling information that might be helpful to other STAs that is not part of the STA transmitting this beacon BSS. This information is used to determine insights about the operation of the BSS without connecting to this BSS. For the sake of coexistence STAs need to obtain information about loading in each direction of transmission, spatial occupancy and time occupancy (scheduling) in each direction. STAs in the BSS should announce information regarding the spatial loading, spatial occupancy and spatial scheduling so other STA in the vicinity can better access the channel. Other STAs receiving this announcement use this information to take decision regarding accessing the channel, accessing a specific spatial direction, or switching to another channel.

The wireless directional system disclosed is applicable to a wide range of network applications, for example device-to-device (D2D), peer-to-peer (P2P), wireless and mesh networking applications which can be applied to wireless LAN (WLAN), wireless personal area networks (WPAN), and outdoor wireless communications. The target applications for example include, but are not limited to, Wi-Fi, WiGig, and other wireless networks, Internet of things (IoT) applications, backhauling and fronthaul of data, indoor and outdoor distribution networks, mesh networks, next generation cellular networks with D2D communications, and numerous other applications as will be readily recognized by one of ordinary skill in the art.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 4 is a data field diagram depicting a DN configuration element for an IEEE 802.11 WLAN.

FIG. 7 is a data field diagram depicting a sector sweep (SSW) frame element for IEEE 802.11ad.

FIG. 8 is a data field diagram depicting the SSW field within the SSW frame element for IEEE 802.11ad.

FIG. 9A and FIG. 9B are data field diagrams depicting SSW feedback fields shown when transmitted as part of an ISS in FIG. 9A, and when not transmitted as part of an ISS in FIG. 9B, as utilized for IEEE 802.11ad.

FIG. 16A and FIG. 16B are signaling and directional beam diagrams showing another case of channel allocations and loading according to an embodiment of the present disclosure.

FIG. 17 is a data field diagram of Tx and Rx reception statistics according to an embodiment of the present disclosure.

FIG. 18 is a data field diagram of spatial loading statistics according to an embodiment of the present disclosure.

FIG. 19 is a data field diagram of a loading statistics element according to an embodiment of the present disclosure.

FIG. 21 is a data field diagram of a EDMG extended schedule element format according to an embodiment of the present disclosure.

FIG. 22 data field diagram of the subfields in the channel allocation field as shown in FIG. 21, according to an embodiment of the present disclosure.

Figure 23:
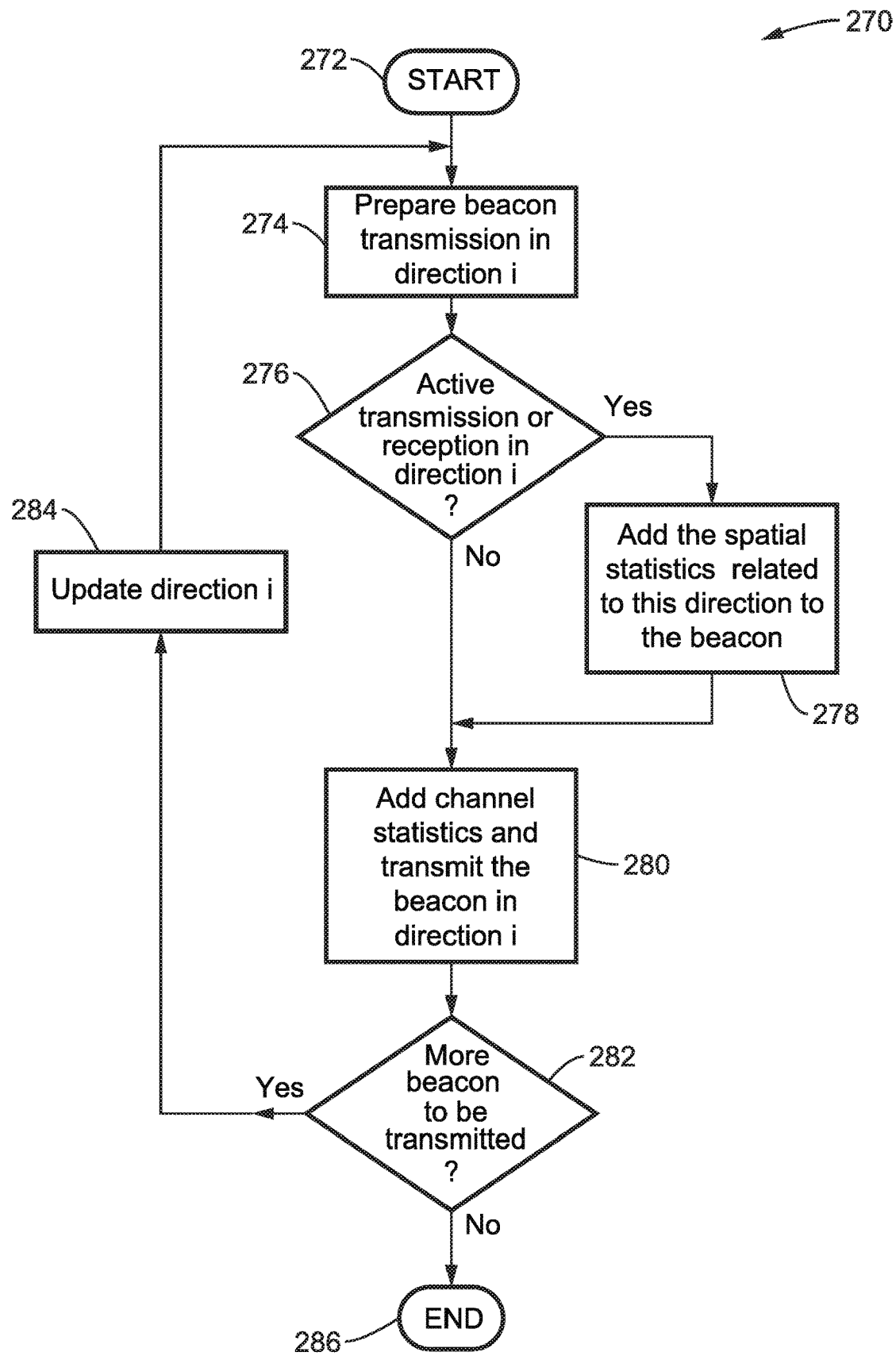

FIG. 23 is a flow diagram of transmitting beacons containing spatial statistics information according to an embodiment of the present disclosure.

Figure 24A:
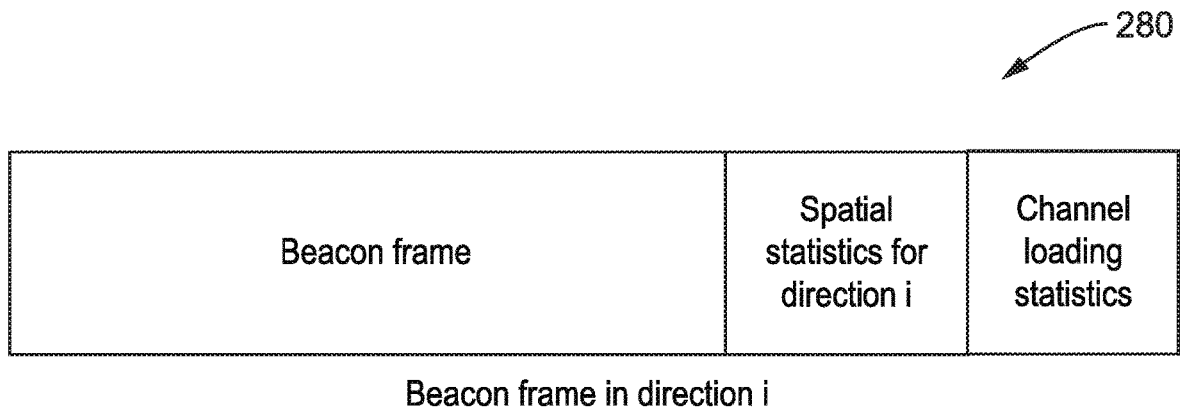
Figure 24B:
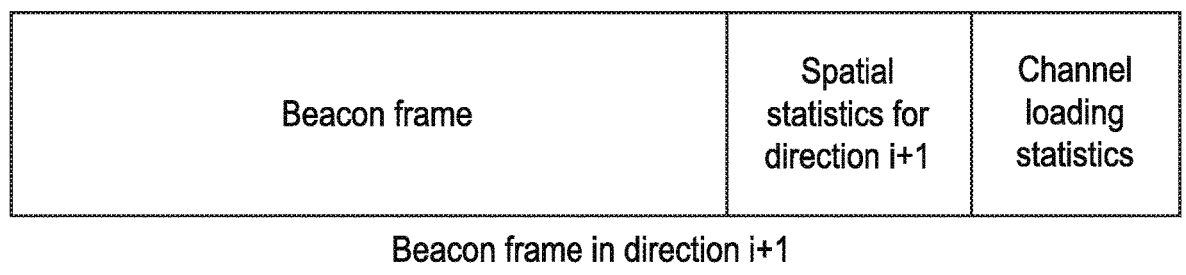
Figure 24C:
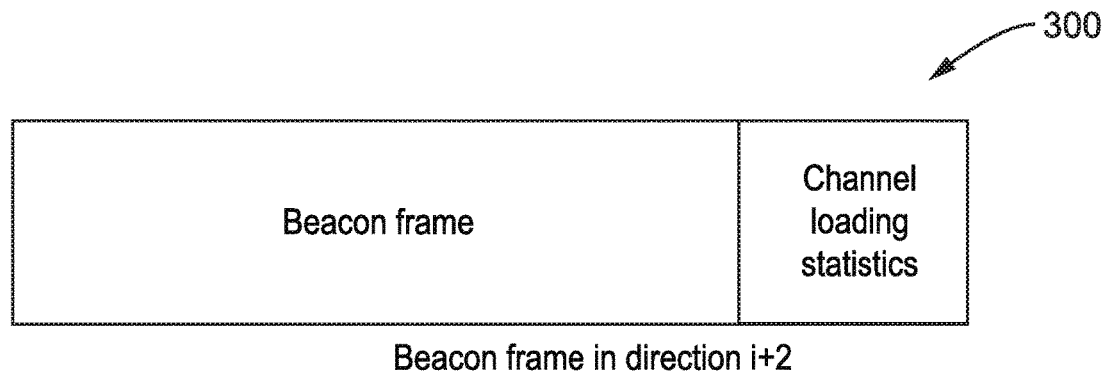

FIG. 24A through FIG. 24C are signaling diagrams showing example beacon frames transmitted in different directions according to an embodiment of the present disclosure.

Figure 25:
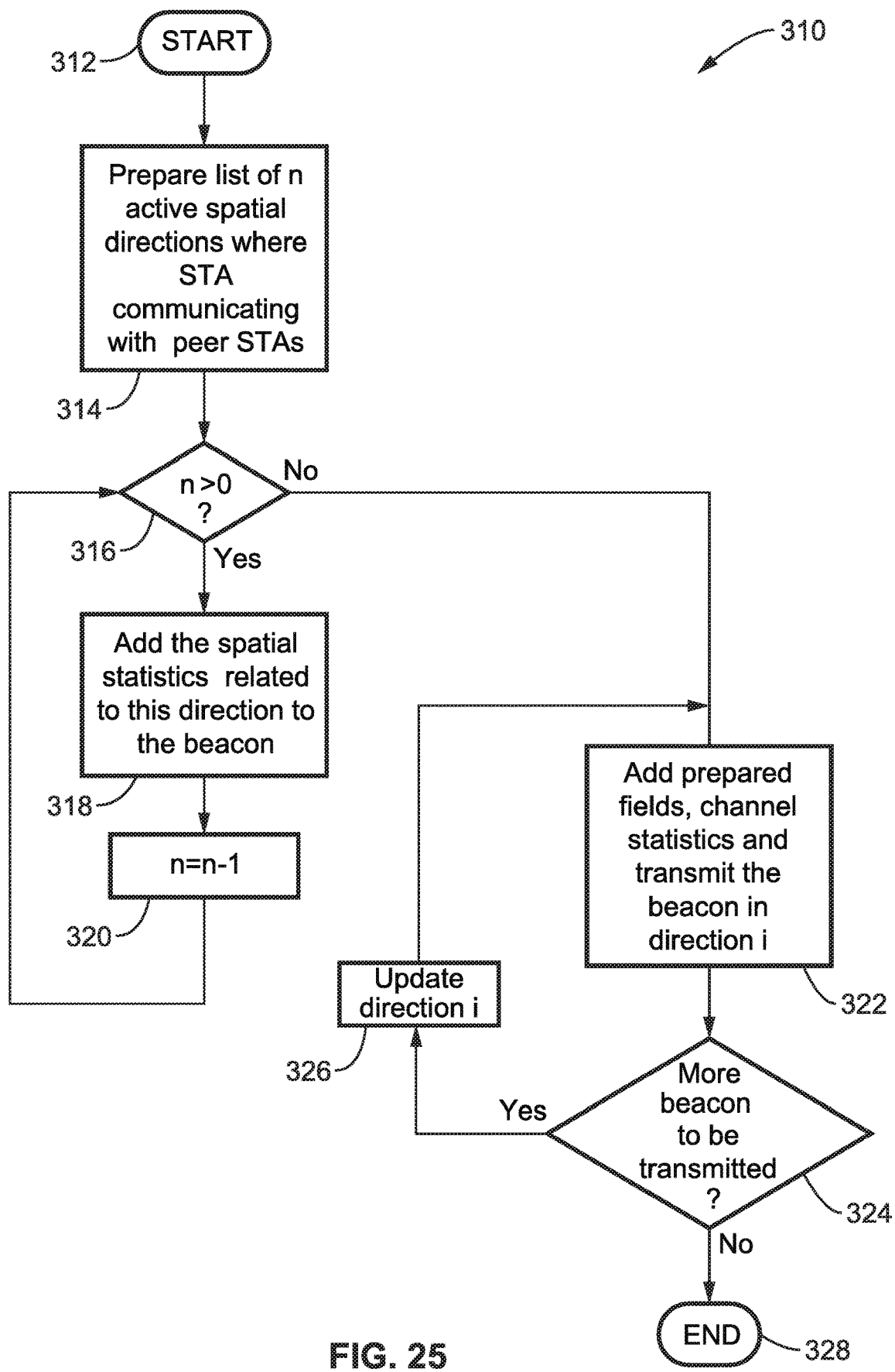

FIG. 25 is a flow diagram of transmitting beacons with spatial statistics and channel statistics according to an embodiment of the present disclosure.

FIG. 26A and FIG. 26B are signaling diagrams showing broadcasting EDMG allocation information across all directions according to an embodiment of the present disclosure.

Figure 27:
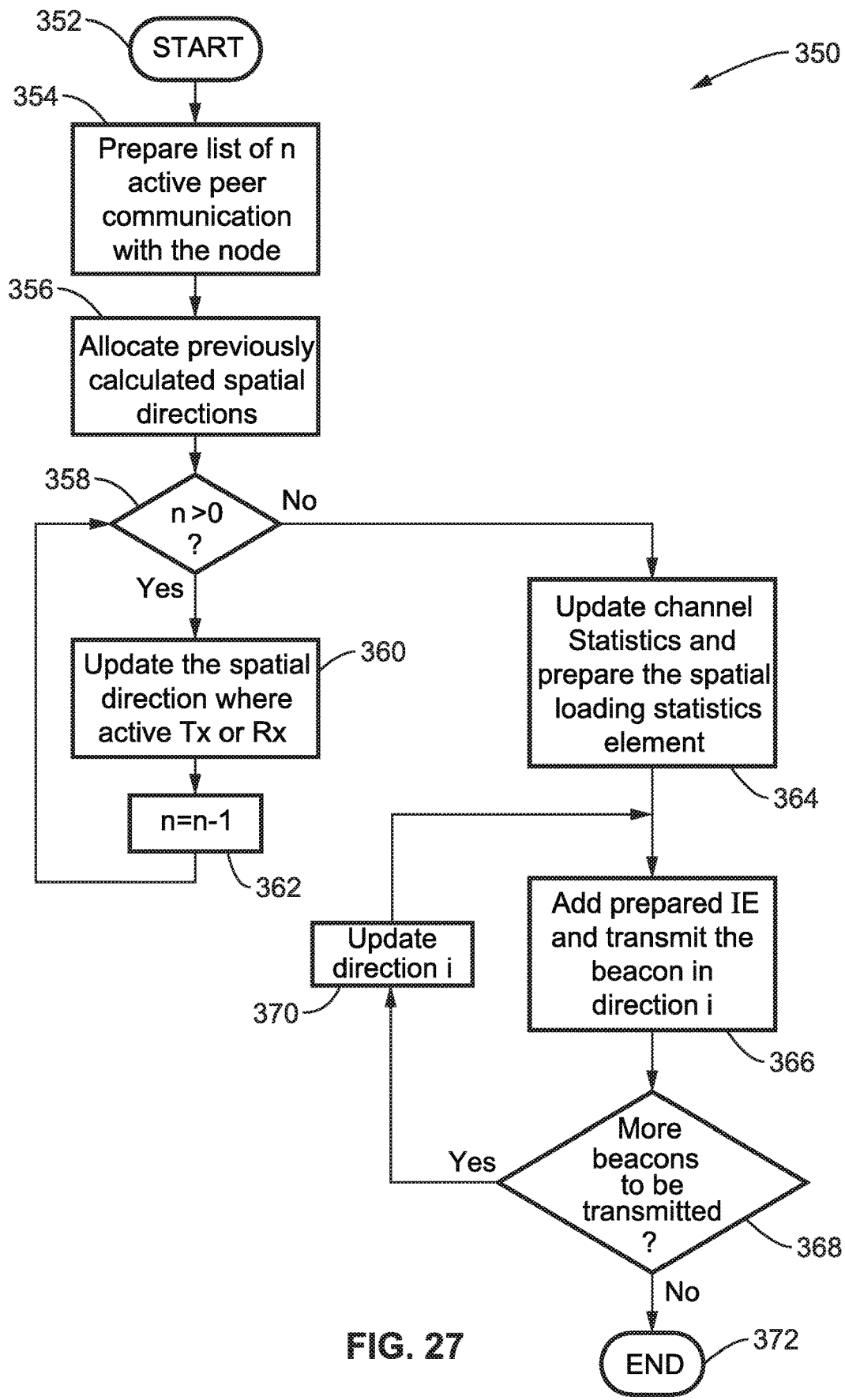

FIG. 27 is a flow diagram of transmitting beacons with the spatial loading statistics element according to an embodiment of the present disclosure.

Figure 28A:
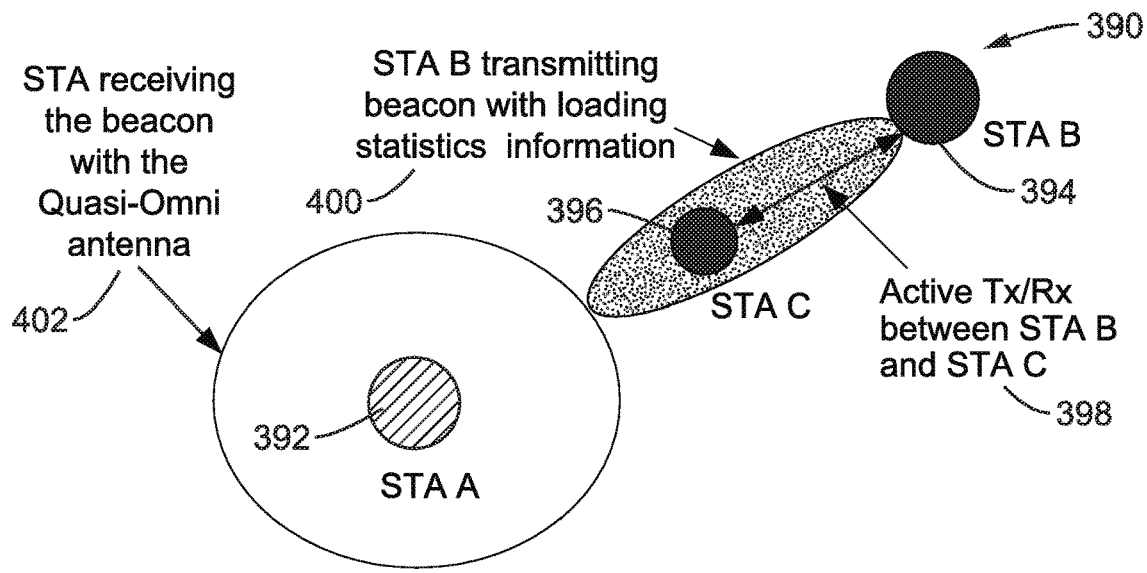
Figure 28B:
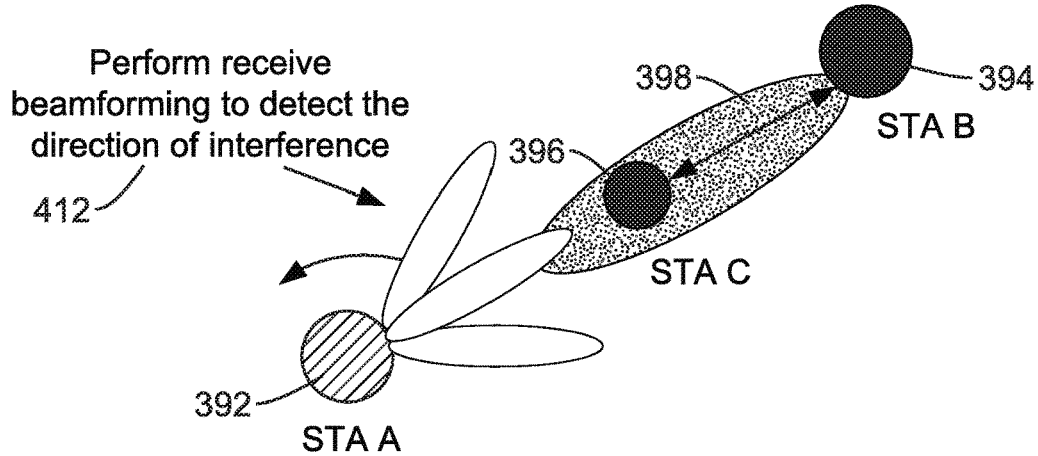
Figure 28C:
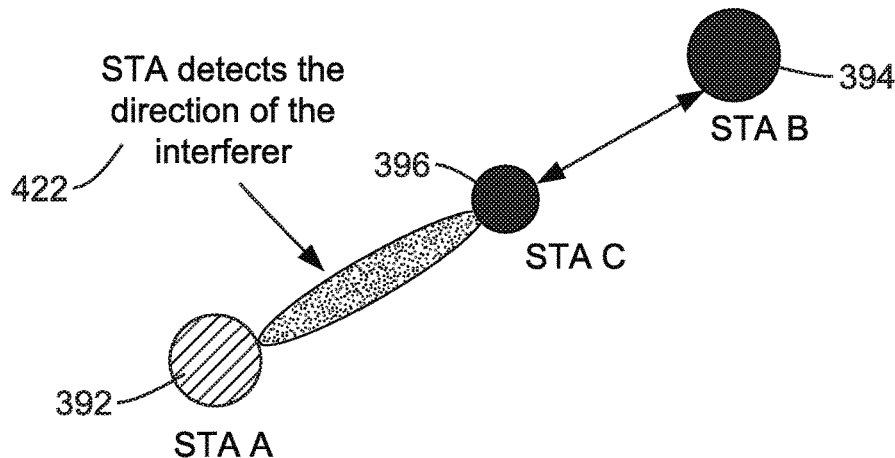

FIG. 28A through FIG. 28C are communication process diagrams showing a station receiving a beacon with allocation and directional information according to an embodiment of the present disclosure.

Figure 29A:
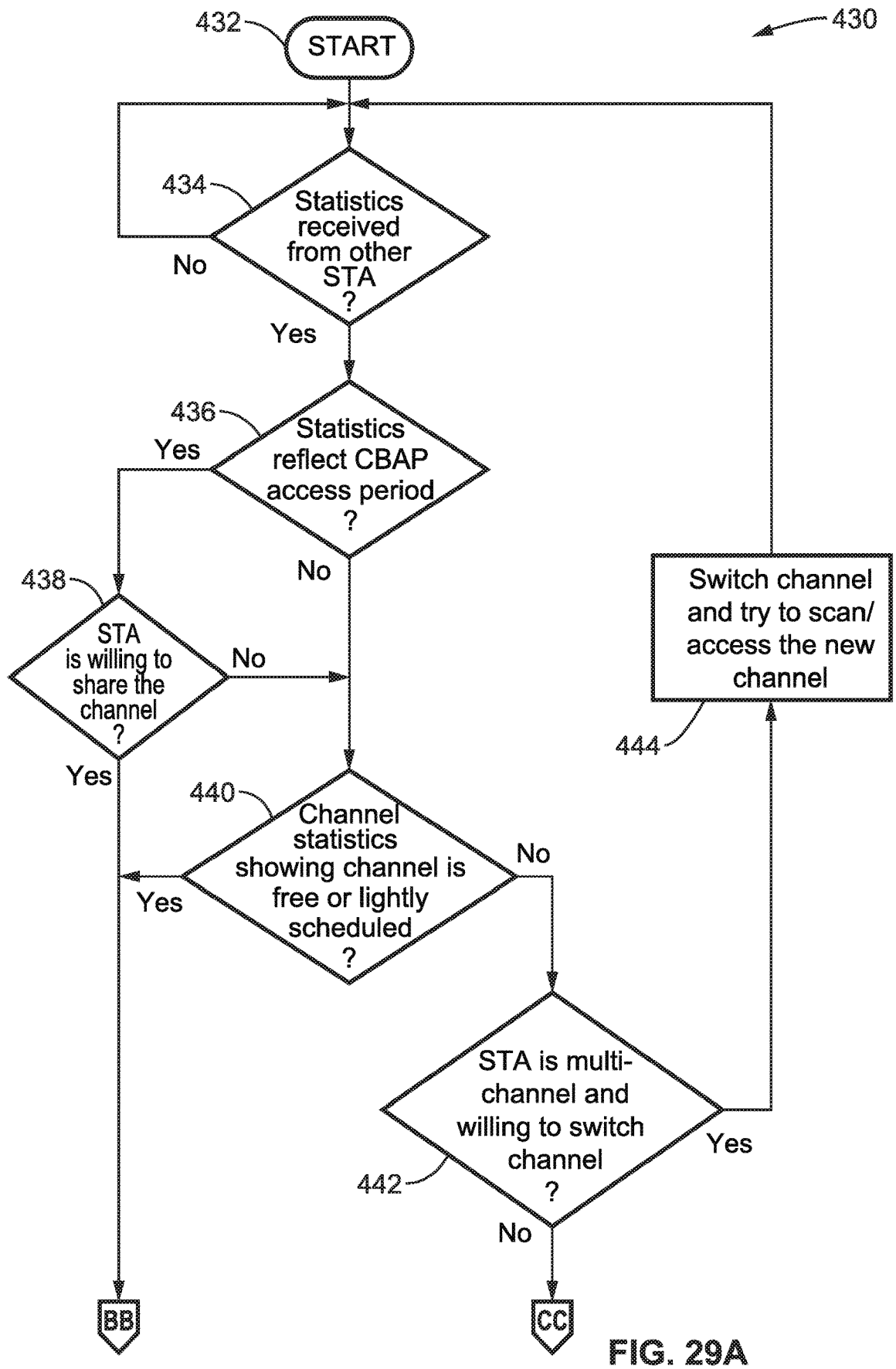
Figure 29B:
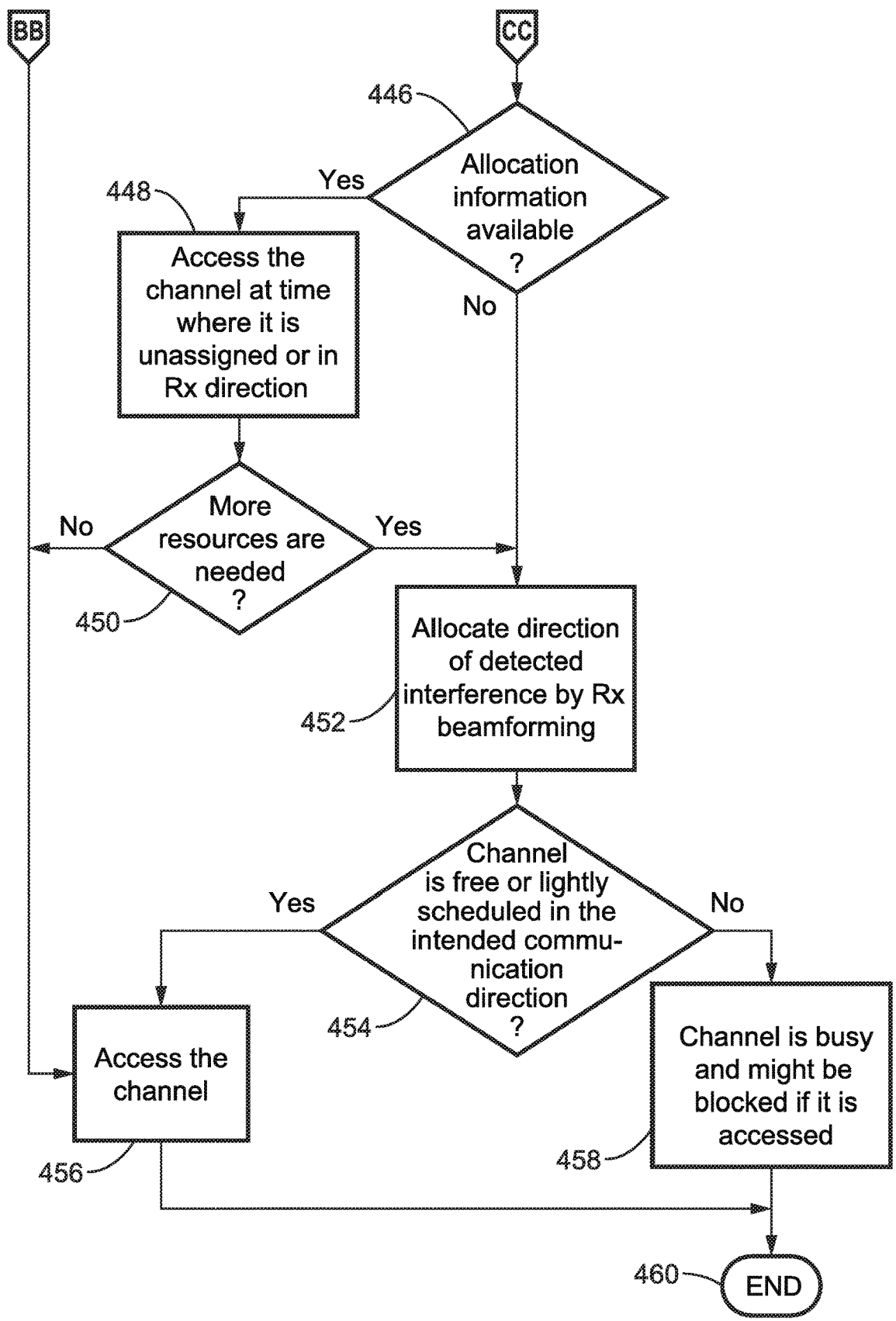

FIG. 29A and FIG. 29B are a flow diagram of a station receiving the statistics of other channels before accessing the channel according to an embodiment of the present disclosure.

Figure 30:
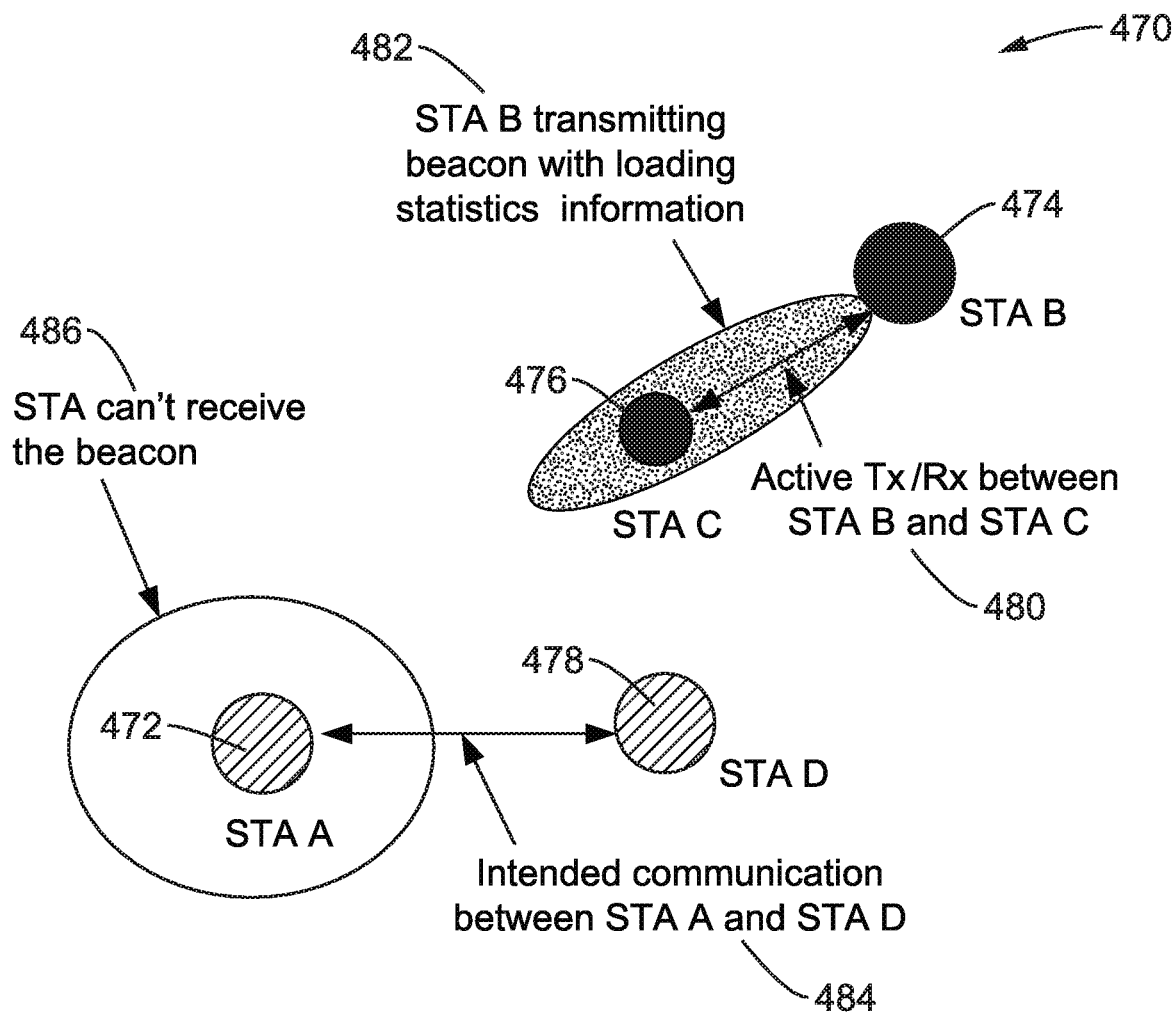

FIG. 30 is a communication process diagram showing how a station using Omni directional reception can miss the beacon with channel statistics when not operating according to an embodiment of the present disclosure.

Figure 31:
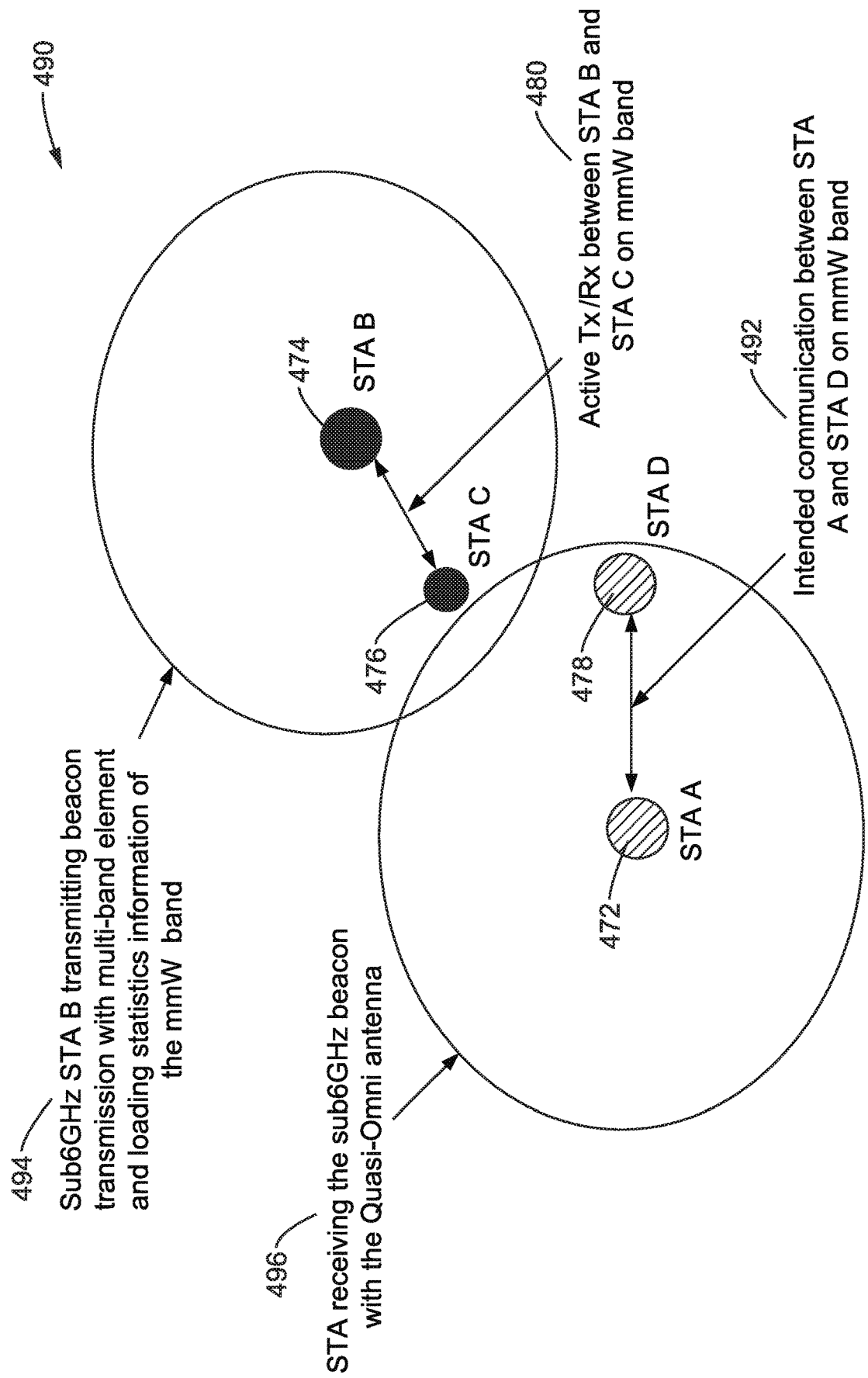

FIG. 31 is a communication process diagram showing how loading statistics can be sent over an Omni directional channel according to an embodiment of the present disclosure.

Figure 32:
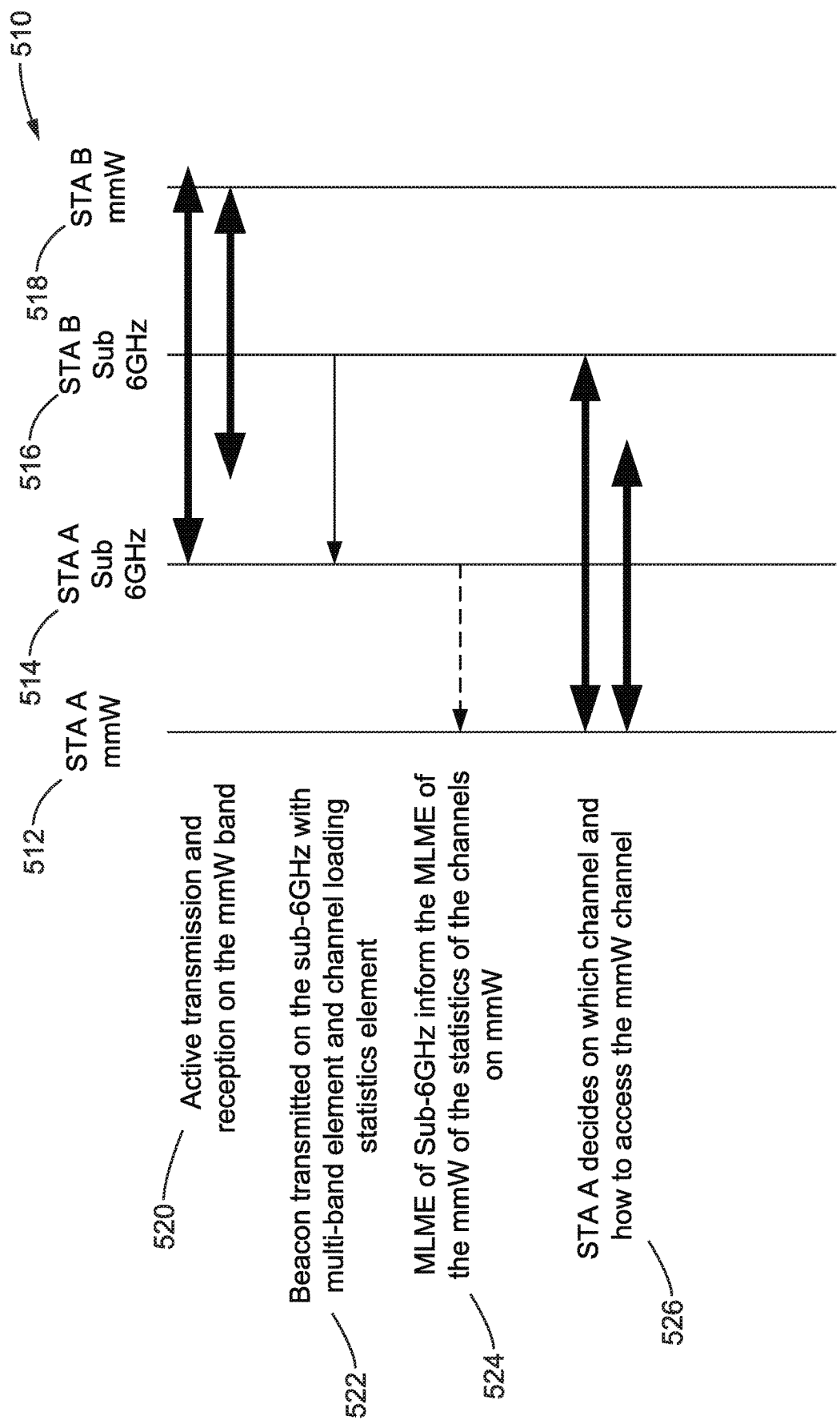

FIG. 32 is a communication exchange diagram showing use of Omni directional and directional communication in providing channel and loading statistics according to an embodiment of the present disclosure.

Figure 33:
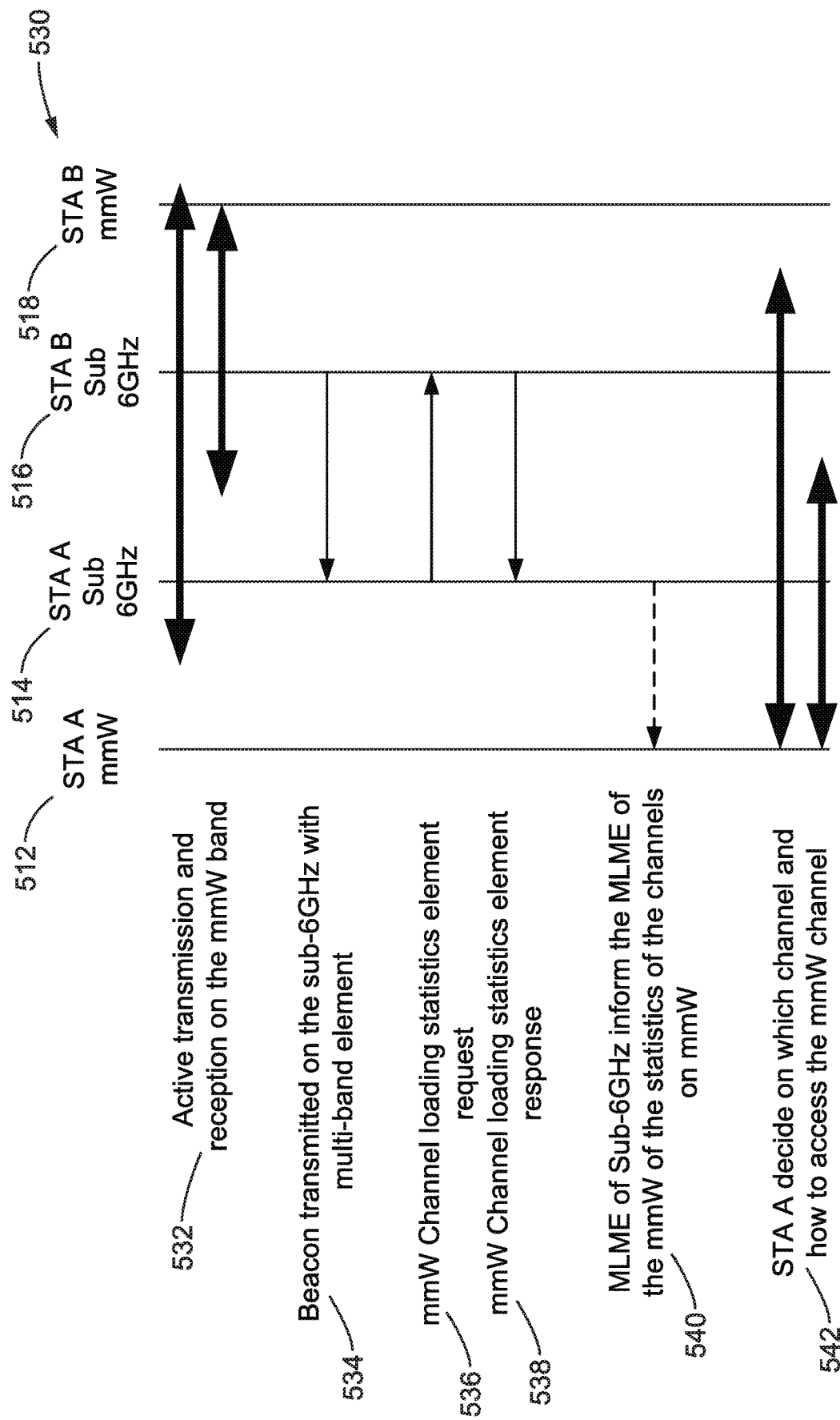

FIG. 33 is a communication exchange diagram showing a loading information request over an Omni directional communication as fulfilled by another station node according to an embodiment of the present disclosure.

DETAILED DESCRIPTION

1. Definition of Terms

A number of terms are utilized in the disclosure whose meanings are generally described below.

A-BFT: Association-Beamforming Training period; a period announced in the beacons that is used for association and beamform (BF) training of new stations (STAs) joining the network.

AP: Access Point; an entity that contains one station (STA) and provides access to the distribution services, through the wireless medium (WM) for associated STAs.

Beamforming (BF): a directional transmission from a directional antenna system or array, and not an Omni-directional or quasi-Omni antenna, for determining information for improving received signal power or signal-to-noise ratio (SNR) at the intended receiver, and under which stations can obtain information for correlating time and directional allocation information.

BSS: Basic Service Set is a set of stations (STAs) that have successfully synchronized with an AP in the network.

BI: the Beacon Interval is a cyclic super frame period that represents the time between beacon transmission times.

BRP: BF Refinement protocol is a BF protocol that enables receiver training and iteratively trains transmitter and receiver sides to optimize (achieve the best possible) directional communications.

BSS: Basic Service Set, is a component of the IEEE 802.11 WLAN architecture, built around a BSS which is actually a set of STAs connecting to the wireless medium allowing the STAs to communicate with each other.

BTI: Beacon Transmission Interval is the interval between successive beacon transmissions.

CBAP: Contention-Based Access Period is the time period within the data transfer interval (DTI) of a directional multi-gigabit (DMG) BSS where contention-based enhanced distributed channel access (EDCA) is utilized.

CCA: Clear Channel Assessment is a wireless carrier sense mechanism defined in IEEE 802.11.

DMG: Directional Multi-Gigabit is a form of high throughput wireless communications described in IEEE 802.

EDMG: Extended Directional Multi-Gigabit is a form of high throughput wireless communications described in IEEE 802.

DTI: Data Transfer Interval is the period in which full BF training is permitted followed by actual data transfer. The DTI can include one or more service periods (SPs) and contention-based access periods (CBAPs).

LOS: Line-of-Sight, a communication in which the transmitter and receiver are ostensibly within sight of one another, and not the result of communication of a reflected signal; the opposite condition is NLOS for non-line-of-sight in which stations are not in LOS of one another.

MAC address: a Medium Access Control (MAC) address.

MBSS: Mesh Basic Service Set is a basic service set (BSS) that forms a self-contained network of distributed network (DN) Stations (DN STAs) which may be used as a distribution system (DS).

MCS: Modulation and Coding Scheme; defines an index that can be translated into the physical (PHY) layer (e.g., OSI model) data rate.

MSTA: Mesh station (MSTA) is a station (STA) that implements the Mesh facility, and when it operates in the Mesh BSS it may provide the distribution services for other MSTAs.

DN STA: distributed network (DN) station (DN STA) is a station (STA) that implements the DN facility. A DN STA that operates in the DN BSS may provide the distribution services for other DN STAs.

Omni-directional: a mode of transmission utilizing a non-directional antenna.

Quasi-Omni directional: is a mode of communication utilizing a directional multi-gigabit (DMG) antenna with the widest beamwidth attainable.

Receive sector sweep (RXSS): Reception of Sector Sweep (SSW) frames via (across) different sectors, in which a sweep is performed between consecutive receptions.

RSSI: receive signal strength indicator (in dBm).

SLS: Sector-level Sweep phase is a BF training phase that can include as many as four components: an Initiator Sector Sweep (ISS) to train the initiator, a Responder Sector Sweep (RSS) to train the responder link, such as using SSW Feedback and an SSW ACK.

SNR: received Signal-to-Noise Ratio in dB.

SP: Service Period is the time period that is scheduled by the access point (AP), with scheduled SPs starting at fixed intervals of time.

Spectral efficiency: the information rate that can be transmitted over a given bandwidth in a specific communication system, usually expressed in bits per second, or in Hertz.

SSID: service Set Identifier is the name assigned to a WLAN network.

STA: Station is a logical entity that is a singly addressable instance of a medium access control (MAC) and physical layer (PHY) interface to the wireless medium (WM).

Sweep: a sequence of transmissions, separated by a short beamforming interframe space (SBIFS) interval, in which the antenna configuration at the transmitter or receiver is changed between transmissions.

SSW: Sector Sweep, is an operation in which transmissions are performed in different sectors (directions) and information collected on received signals, strengths and so forth.

TDD: Time Division Duplex allows the communication link to be duplexed, in which uplink is separated from downlink by the allocation of different time slots in the same frequency band, to adjust for different uplink and downlink data transmission flows.

TDD SP: Time Division Duplexing Service Period is a service period with TDD channel access, in which the TDD SP comprises a sequence of TDD intervals that, in turn, comprise a sequence of TDD slots.

Transmit Sector Sweep (TXSS): is transmission of multiple Sector Sweep (SSW) or Directional Multi-gigabit (DMG) Beacon frames via different sectors, in which a sweep is performed between consecutive transmissions.

2. Existing Directional Wireless Network Technology

2.1. WLAN Systems

In WLAN systems, such as 802.11, there are defined two modes of scanning; passive and active scanning. The following are the characteristics of passive scanning. (a) A new station (STA) attempting to join a network, examines each channel and waits for beacon frames for up to MaxChannelTime. (b) If no beacon is received, then the new STA moves to another channel, thus saving battery power since the new STA does not transmit any signal in scanning mode. The STA should wait enough time at each channel so that it does not miss the beacons. If a beacon is lost, the STA should wait for another beacon transmission interval (BTI).

The following are the characteristics of active scanning. (a) A new STA wanting to join a local network sends probe request frames on each channel, according to the following. (a)(1) The new STA moves to a channel, waits for incoming frames or a probe delay timer to expire. (a)(2) If no frame is detected after the timer expires, the channel is considered to not be in use. (a)(3) If a channel is not in use, the STA moves to a new channel. (a)(4) If a channel is in use, the STA gains access to the medium using regular DCF and sends a probe request frame. (a)(5) The STA waits for a desired period of time (e.g., Minimum Channel Time) to receive a response to the probe request if the channel was never busy. The STA waits for more time (e.g., Maximum Channel Time) if the channel was busy and a probe response was received.

(b) A Probe Request can use a unique service set identifier (SSID), list of SSIDs or a broadcast SSID. (c) Active scanning is prohibited in some frequency bands. (d) Active scanning can be a source of interference and collision, especially if many new STAs arrive at the same time and are attempting to access the network. (e) Active scanning is a faster way (less delay) for STAs to gain access to the network compared to the use of passive scanning, since STAs do not need to wait for beacons. (f) In the infrastructure basic service set (BSS) and IBSS, at least one STA is awake to receive and respond to probes. (g) STAs in a distributed network (DN) basic service set (MBSS) might not be awake at any point of time to respond. (h) When radio measurement campaigns are active, STAs might not answer the probe requests. (i) Collision of probe responses can arise. STAs might coordinate the transmission of probe responses by allowing the STA that transmitted the last beacon to transmit the first Probe Response. Other STAs can follow and use back-off times and regular distributed coordination function (DCF) channel access to avoid collision.

Figure 1:
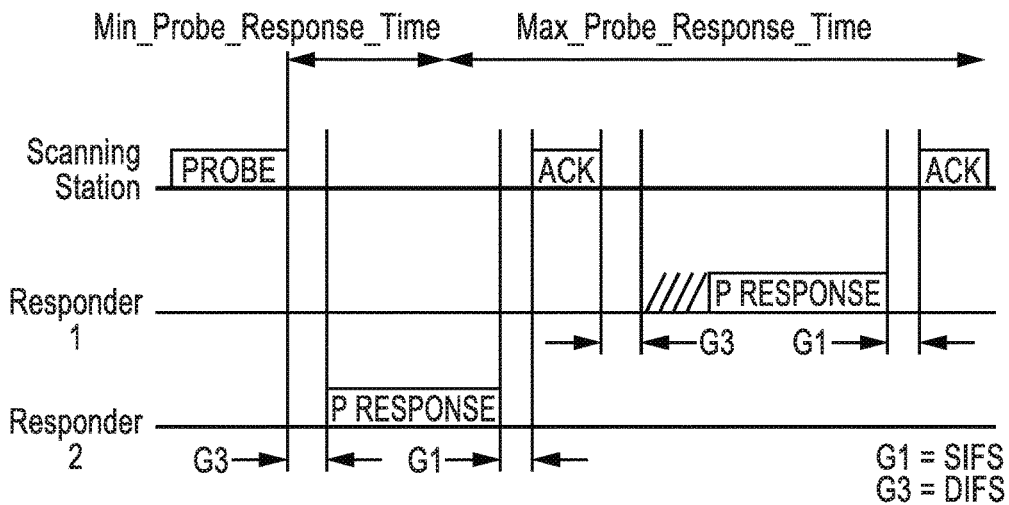
FIG. 1 is a timing diagram of active scanning performed in an IEEE 802.11 wireless local area network (WLAN).

FIG. 1 depicts the use of active scanning in an IEEE 802.11 WLAN, depicting a scanning station sending a probe and two responding stations which receive and respond to the probe. The figure also shows the minimum and maximum probe response timing. The value G1 is shown set to SIFS which is the interframe spacing prior to transmission of an acknowledgment, while value G3 is DIFS which is DCF interframe spacing, represented the time delay for which a sender waits after completing a backoff period before sending an RTS package.

2.2. IEEE 802.11s Distributed Network (DN) WLAN

IEEE 802.11s (hereafter 802.11s) is a standard that adds wireless mesh networking capabilities to the 802.11 standard. In 802.11s new types of radio stations are defined as well as new signaling to enable mesh network discovery, establishing peer-to-peer connection, and routing of data through the mesh network.

Figure 2:
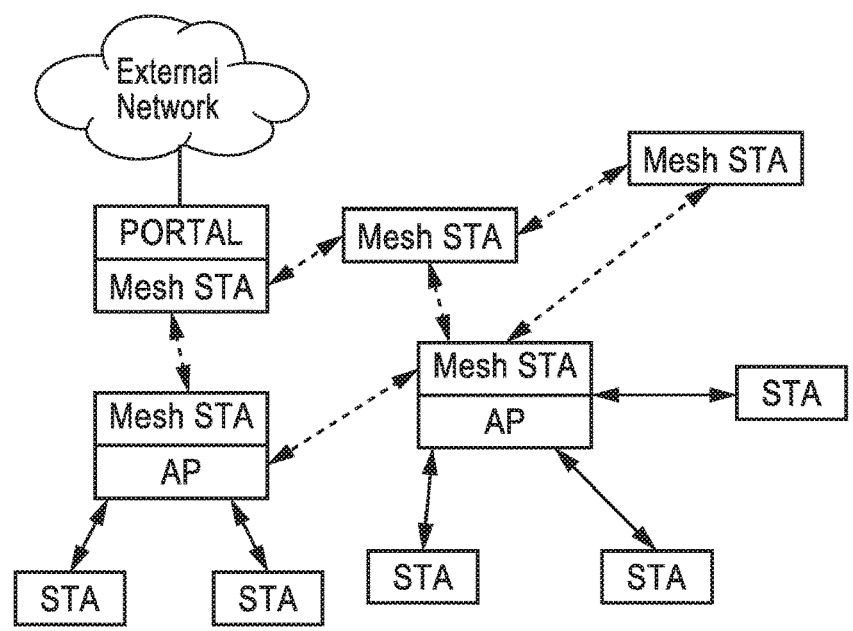
FIG. 2 is a station (STA) diagram for a Distributed Network (DN) showing a combination of DN and non-DN stations.

FIG. 2 illustrates one example of a mesh network where a mix of non-mesh STA connect to Mesh-STA/AP (solid lines) and Mesh STAs connect to other mesh STA (dotted lines) including a mesh portal. Nodes in mesh networks use the same scanning techniques defined in the 802.11 standard for discovering neighbors. The identification of the mesh network is given by the Mesh ID element contained in the Beacon and the Probe Response frames. In one mesh network, all mesh STAs use the same mesh profile. Mesh profiles are considered the same if all parameters in the mesh profiles match. The mesh profile is included in the Beacon and Probe Response frames, so that the mesh profile can be obtained by its neighbor mesh STAs through the scan.

When a mesh STA discovers a neighbor mesh STA through the scanning process, the discovered mesh STA is considered a candidate peer mesh STA. It may become a member of the mesh network, of which the discovered mesh STA is a member, and establish a mesh peering with the neighbor mesh STA. The discovered neighbor mesh STA may be considered a candidate peer mesh STA when the mesh STA uses the same mesh profile as the received Beacon or Probe Response frame indicates for the neighbor mesh STA.

The mesh STA attempts to maintain the discovered neighbor's information in a Mesh Neighbors Table which includes: (a) neighbor MAC address; (b) operating channel number; and (c) the most recently observed link status and quality information. If no neighbors are detected, the mesh STA adopts the Mesh ID for its highest priority profile and remains active. All the previous signaling to discover neighbor mesh STAs are performed in broadcast mode. It should be appreciated that 802.11s was not targeted for networks with directional wireless communications.

Figure 3:
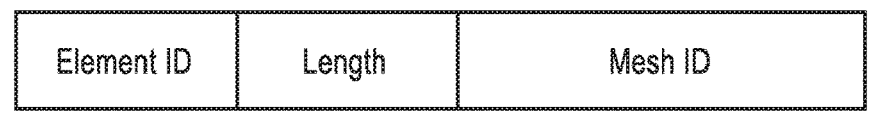
FIG. 3 is a data field diagram depicting a DN identification element for an IEEE 802.11 WLAN.

FIG. 3 depicts a Mesh Identification element (Mesh ID element) which is used to advertise the identification of a Mesh Network. Mesh ID is transmitted in a Probe request, by a new STA willing to join a mesh network, and in beacon and signals, by existing mesh network STAs. A Mesh ID field of length 0 indicates the wildcard Mesh ID, which is used within a Probe Request frame. A wildcard Mesh ID is a specific ID that prevents a non-mesh STA from joining a mesh network. It should be recognized that a mesh station is a STA that has more features than a non-mesh station, for example a mesh network is like having the STA running as a module in additional to some other modules to serve the mesh functionality. If the STA does not have this mesh module it should not be allowed to connect to a mesh network.

FIG. 4 depicts a Mesh configuration element as contained in Beacon frames and Probe Response frames transmitted by mesh STAs, and it is used to advertise mesh services. The main contents of the Mesh Configuration elements are: (a) a path selection protocol identifier; (b) a path selection metric identifier; (c) a congestion control mode identifier; (d) a synchronization method identifier; and (e) an authentication protocol identifier. The contents of the Mesh Configuration Element together with the Mesh ID form a mesh profile.

The 802.11a standard defines many procedures and mesh functionalities including: mesh discovery, mesh peering management, mesh security, mesh beaconing and synchronization, mesh coordination function, mesh power management, mesh channel switching, three address, four address, and extended address frame formats, mesh path selection and forwarding, interworking with external networks, intra-mesh congestion control and emergency service support in mesh BSS.

2.3. Millimeter Wave in WLAN

WLANs in millimeter wave bands generally require the use of directional antennas for transmission, reception or both, to account for the high path loss and to provide sufficient SNR for communication. Using directional antennas in transmission or reception makes the scanning process directional as well. IEEE 802.11ad and the new standard 802.11 ay define procedures for scanning and beamforming for directional transmission and reception over the millimeter wave band.

2.4. IEEE 802.11ad Scanning and BF Training

An example of a mmWave WLAN state-of-the-art system is the 802.11ad standard.

2.4.1. Scanning

A new STA operates on passive or active scanning modes to scan for a specific SSID, a list of SSIDs, or all discovered SSIDs. To passively scan, a STA scans for DMG beacon frames containing the SSID. To actively scan: a DMG STA transmits Probe Request frames containing the desired SSID or one or more SSID List elements. The DMG STA might also have to transmit DMG Beacon frames or perform beamforming training prior to the transmission of Probe Request frames.

2.4.2. BF Training

BF training is a bidirectional sequence of BF training frame transmissions that uses a sector sweep and provides the necessary signaling to allow each STA to determine appropriate antenna system settings for both transmission and reception.

The 802.11ad BF training process can be performed in three phases. (1) A sector level sweep phase is performed whereby directional transmission with low gain (quasi-Omni) reception is performed for link acquisition. (2) A refinement stage is performed that adds receive gain and final adjustment for combined transmit and receive. (3) Tracking is then performed during data transmission to adjust for channel changes.

2.4.3. 802.11ad SLS BF Training Phase

This SLS BF Training Phase focuses on the sector level sweep (SLS) mandatory phase of the 802.11ad standard. During SLS, a pair of STAs exchange a series of sector sweep (SSW) frames (or beacons in case of transmit sector training at the PCP/AP) over different antenna sectors to find the one providing highest signal quality. The station that transmits first is called the initiator; the station that transmits second is referred to as the responder.

During a transmit sector sweep (TXSS), SSW frames are transmitted on different sectors while the pairing STA (the responder) receives utilizing a quasi-Omni directional pattern. The responder determines the antenna array sector from the initiator which provides the best link quality (e.g. SNR), or will otherwise support communications between the stations.

Figure 5:
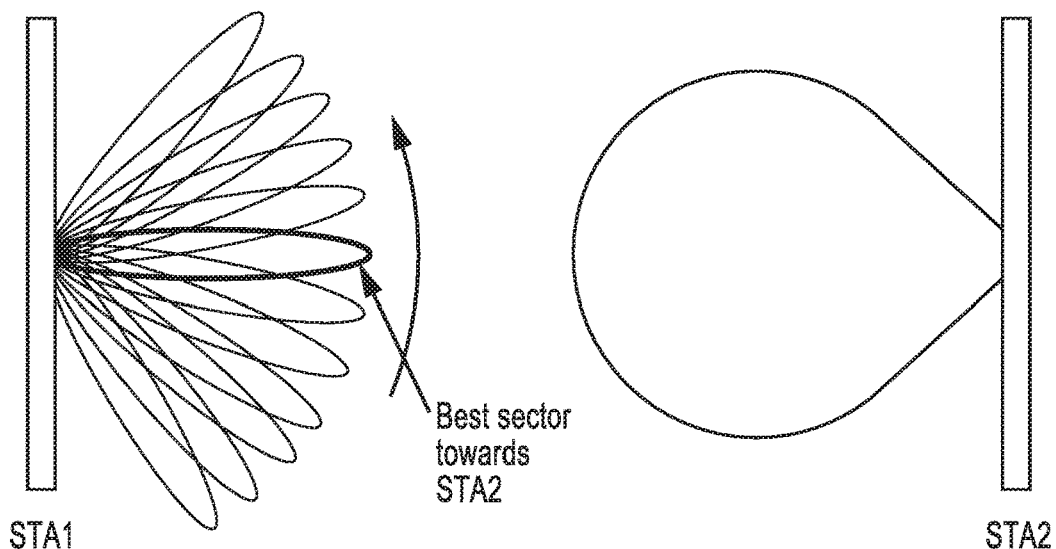
FIG. 5 is a schematic of antenna sector sweeping (SSW) in the IEEE 802.11ad protocol.

FIG. 5 depicts the concept of sector sweep (SSW) in 802.11ad. In this figure, an example is given in which STA 1 is an initiator of the SLS and STA 2 is the responder. STA 1 sweeps through all of the transmit antenna pattern fine sectors while STA 2 receives in a quasi-Omni pattern. STA 2 feeds back to STA 2 the best sector it received from STA 1.

Figure 6:
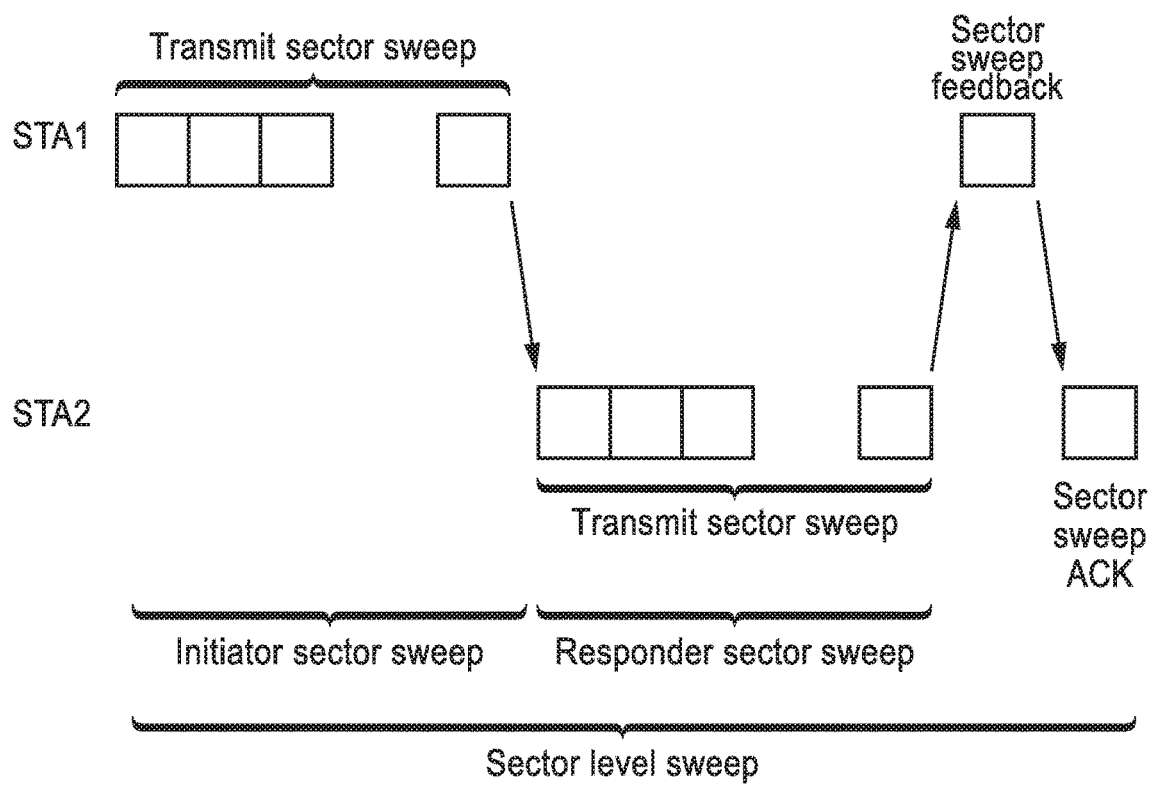
FIG. 6 is a signaling diagram showing signaling of sector-level sweeping (SLS) in the IEEE 802.11ad protocol.

FIG. 6 illustrates the signaling of the sector-level sweep (SLS) protocol as implemented in 802.11ad specifications. Each frame in the transmit sector sweep includes information on sector countdown indication (CDOWN), a Sector ID, and an Antenna ID. The best Sector ID and Antenna ID information are fed back with the Sector Sweep Feedback and Sector Sweep ACK frames.

FIG. 7 depicts the fields for the sector sweep frame (an SSW frame) as utilized in the 802.11ad standard, with the fields outlined below. The Duration field is set to the time until the end of the SSW frame transmission. The RA field contains the MAC address of the STA that is the intended receiver of the sector sweep. The TA field contains the MAC address of the transmitter STA of the sector sweep frame.

FIG. 8 illustrates data elements within the SSW field. The principle information conveyed in the SSW field is as follows. The Direction field is set to 0 to indicate that the frame is transmitted by the beamforming initiator and set to 1 to indicate that the frame is transmitted by the beamforming responder. The CDOWN field is a down-counter indicating the number of remaining DMG Beacon frame transmissions to the end of the TXSS. The sector ID field is set to indicate sector number through which the frame containing this SSW field is transmitted. The DMG Antenna ID field indicates which DMG antenna the transmitter is currently using for this transmission. The RXSS Length field is valid only when transmitted in a CBAP and is reserved otherwise. This RXSS Length field specifies the length of a receive sector sweep as required by the transmitting STA, and is defined in units of a SSW frame. The SSW Feedback field is defined below.

FIG. 9A and FIG. 9B depict SSW feedback fields. The format shown in FIG. 9A is utilized when transmitted as part of an Internal Sublayer Service (ISS), while the format of FIG. 9B is used when not transmitted as part of an ISS. The Total Sectors in the ISS field indicate the total number of sectors that the initiator uses in the ISS. The Number of Rx DMG Antennas subfield indicates the number of receive DMG antennas the initiator uses during a subsequent Receive Sector Sweep (RSS). The Sector Select field contains the value of the Sector ID subfield of the SSW field within the frame that was received with best quality in the immediately preceding sector sweep. The DMG Antenna Select field indicates the value of the DMG Antenna ID subfield of the SSW field within the frame that was received with best quality in the immediately preceding sector sweep. The SNR Report field is set to the value of the SNR from the frame that was received with best quality during the immediately preceding sector sweep, and which is indicated in the sector select field. The poll required field is set to 1 by a non-PCP/non-AP STA to indicate that it requires the PCP/AP to initiate communication with the non-PCP/non-AP. The Poll Required field is set to 0 to indicate that the non-PCP/non-AP has no preference about whether the PCP/AP initiates the communication.

3. Station (STA) Hardware Configuration

Figure 10:
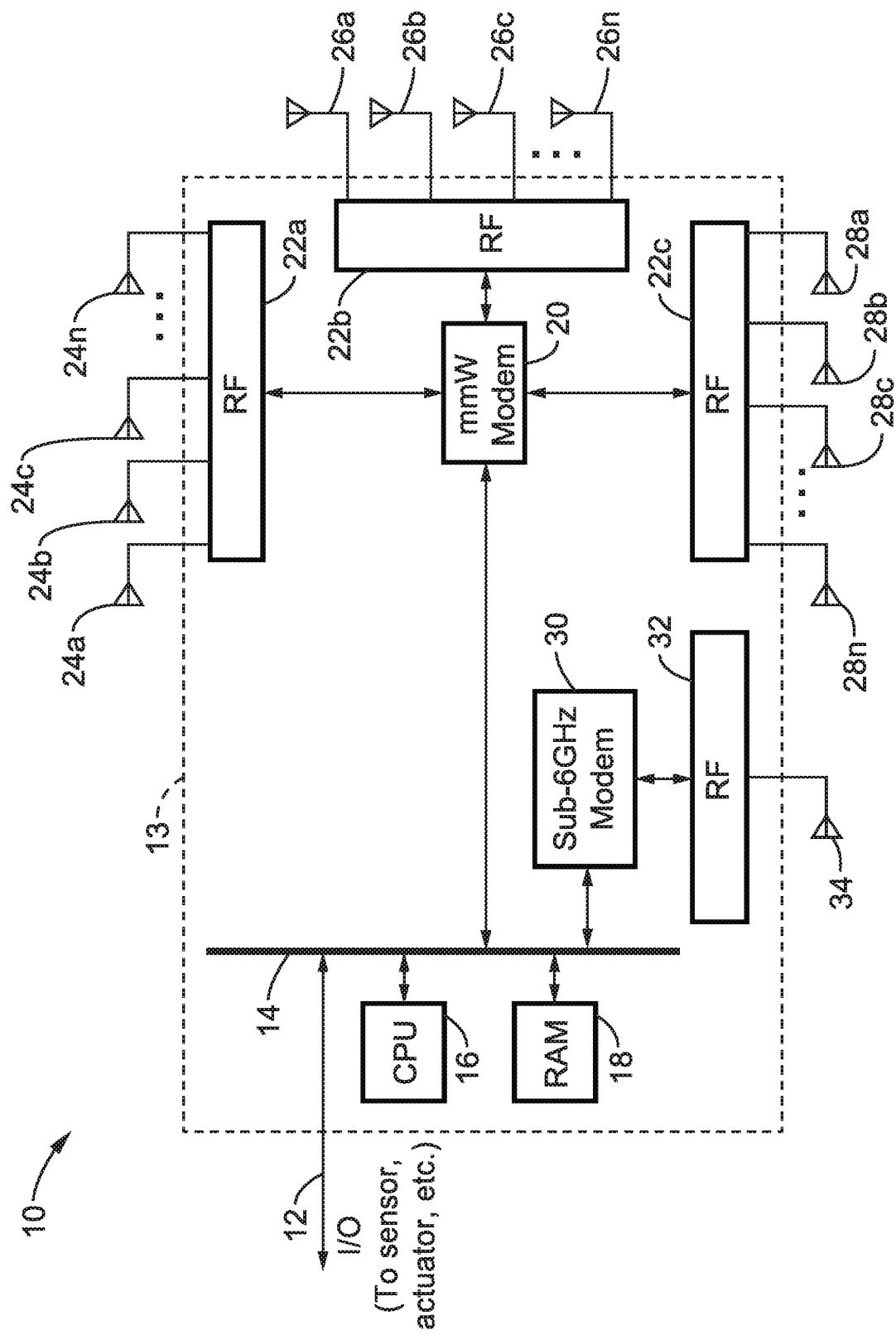
FIG. 10 is a block diagram of wireless mmW communication station hardware as utilized according to an embodiment of the present disclosure.

FIG. 10 illustrates an example embodiment 10 of STA hardware configuration showing I/O path 12 into hardware block 13, having a computer processor (CPU) 16 and memory (RAM) 18 coupled to a bus 14, which is coupled to I/O path 12 giving the STA external I/O, such as to sensors, actuators and so forth. Instructions from memory 18 are executed on processor 16 to execute a program which implements the communication protocols, which are executed to allow the STA to perform the functions of a "new STA", or one of the STAs already in the network. It should also be appreciated that the programming is configured to operate in different modes (source, intermediate, destination), depending on what role it is playing in the current communication context. This host machine is shown configured with a mmW modem 20 coupled to radio-frequency (RF) circuitry 22a, 22b, 22c to a plurality of antennas 24a-24n, 26a-26n, 28a-28n to transmit and receive frames with neighboring STAs. In addition, the host machine is also seen with a sub-6 GHz modem 30 coupled to radio-frequency (RF) circuitry 32 to antenna(s) 34.

Thus, this host machine is shown configured with two modems (multi-band) and their associated RF circuitry for providing communication on two different bands. By way of example and not limitation the intended directional communication band is implemented with a mmW band modem and its associated RF circuitries for transmitting and receiving data in the mmW band. The other band, generally referred to herein as the discovery band, comprises a sub-6 GHz modem and its associated RF circuitry for transmitting and receiving data in the sub-6 GHz band.

Although three RF circuits are shown in this example for the mmW band, embodiments of the present disclosure can be configured with modem 20 coupled to any arbitrary number of RF circuits. In general, using a larger number of RF circuits will result in broader coverage of the antenna beam direction. It should be appreciated that the number of RF circuits and number of antennas being utilized is determined by hardware constraints of a specific device. Some of the RF circuitry and antennas may be disabled when the STA determines it is unnecessary to communicate with neighbor STAs. In at least one embodiment, the RF circuitry includes frequency converter, array antenna controller, and so forth, and is connected to multiple antennas which are controlled to perform beamforming for transmission and reception. In this way the STA can transmit signals using multiple sets of beam patterns, each beam pattern direction being considered as an antenna sector.

Figure 11:
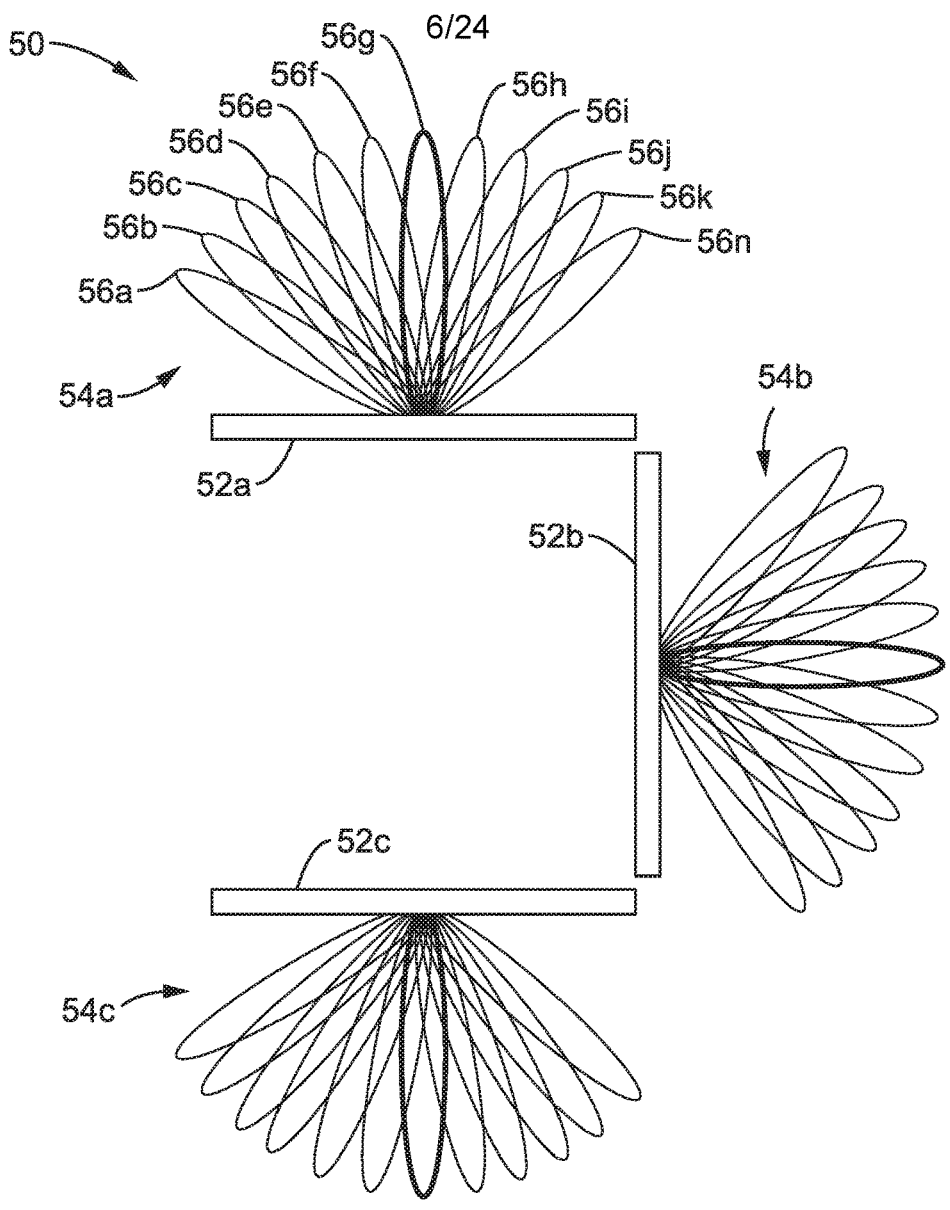
FIG. 11 is a mmW beam pattern diagram for the station hardware of FIG. 10 as utilized according to an embodiment of the present disclosure.

FIG. 11 illustrates an example embodiment 50 of mmWave antenna directions which can be utilized by a STA to generate a plurality (e.g., 36) of mmWave antenna sector patterns. In this example, the STA implements three RF circuits 52a, 52b, 52c and connected antennas, and each RF circuitry and connected antenna generate a beamforming pattern 54a, 54b, 54c. Antenna pattern 54a is shown having twelve beamforming patterns 56a, 56b, 56c, 56d, 56e, 56f, 56g, 56h, 56i, 56j, 56k and 56n ("n" representing that any number of patterns can be supported). The example station using this specific configuration has thirty six (36) antenna sectors, although the present disclosure can support any desired number of antenna sectors. For the sake of clarity and ease of explanation, the following sections generally exemplify STAs with a smaller number of antenna sectors, but this is not to be construed as an implementation limitation. It should be appreciated that any arbitrary beam pattern can be mapped to an antenna sector. Typically, the beam pattern is formed to generate a sharp beam, but it is possible that the beam pattern is generated to transmit or receive signals from multiple angles.

Antenna sector is determined by a selection of mmWave RF circuitry and beamforming commanded by the mmWave array antenna controller. Although it is possible that STA hardware components have different functional partitions from the one described above, such configurations can be deemed to be a variant of the explained configuration. Some of the mmWave RF circuitry and antennas may be disabled when the STA determines it is unnecessary to communicate with neighbor STAs.

In at least one embodiment, the RF circuitry includes frequency converter, array antenna controller, and so forth, and is connected to multiple antennas which are controlled to perform beamforming for transmission and reception. In this way the STA can transmit signals using multiple sets of beam patterns, each beam pattern direction being considered as an antenna sector.

Figure 12:
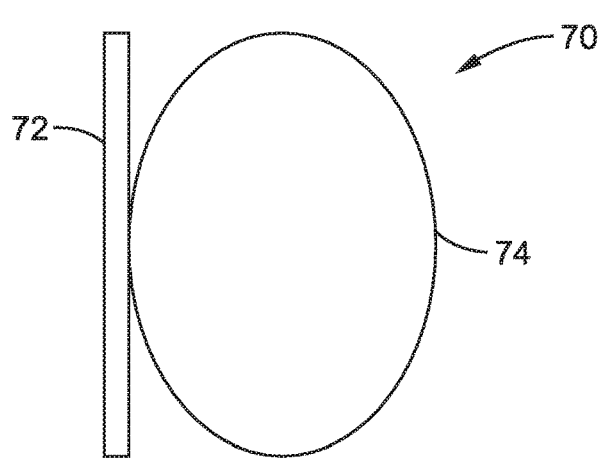
FIG. 12 is a beam pattern diagram for a discovery band communications antenna (i.e., sub-6 GHz), according to an embodiment of the present disclosure.

FIG. 12 illustrates an example embodiment 70 of antenna pattern for the sub-6 GHz modem assumed to use a Quasi-Omni antenna 74 attached to its RF circuitry 72, although other circuitry and/or antennas may be utilized without limitation.

4. Spatial Information Announcements in Present Disclosure

The protocols described herein for stations operating in a wireless network configure the stations to announce channel use statistics in specific directions and/or across all directions to other stations nearby. The information for these announcements may be broadcast or conveyed in a number of different ways without departing from the disclosure.

5. Spatial Loading, Occupancy and Scheduling Announcement

Currently WLAN stations (STAs) under (IEEE802.11 ad or 902.11 ay on a directional upper band (e.g., 60 GHz) transmit a beacon frame in all directions to announce themselves to the STAs in the surrounding area that are not part of its BSS and to manage STAs in the BSS to which it belongs. Thus, STAs in the surrounding area can passively obtain information about the active BSS by receiving beacons from other STAs in the area.

The beacons defined in 802.11 contain information about the SSID, synchronization, availability of multiple bands, bandwidth and channel lists, sleeping and waking up schedules, neighbor reports, BSS load and sometimes other forms of scheduling information that might aid other STAs that are not part of the STA transmitting this beacon BSS. This information is utilized to obtain insights about the operation of the BSS without connecting to this BSS.

However, toward increasing coexistence of STAs, and thus increasing network efficiency, it is important for STAs to obtain information about loading in each direction of transmission, including spatial occupancy and time occupancy (scheduling) in each direction. Accordingly, the present disclosure teaches techniques in which STAs in the BSS announce information regarding spatial loading, spatial occupancy and spatial scheduling, so that other STAs in the vicinity can better access the channel. Other STAs receiving this announcement use the information to improve their decision making regarding accessing the channel, accessing a specific spatial direction, or switching to another channel.

6. Spatial and Channel Information Announcement

STAs announce the usage of the channel by broadcasting a frame that can be received by any STA in its BSS or outside its BSS that has the spatial (directional) usage and channel loading (e.g., time usage) statistics information. The frame to be broadcast can be one of the frames that is already used by the WLAN and can be received by any STA. By way of example and not limitation, a DMG beacon could be utilized to announce spatial and channel information, or any other frame that can be received and accessed by STAs outside the BSS can be utilized without departing from the teachings of the present disclosure.

The protocol can be configured to transmit the announcement frames in each direction of use, or only in the directions where there is an active transmission or reception. The announcement frame contains information about the loading, scheduling and occupancy of each direction. The spatial loading information provides statistics that represent the loading or usage of a specific spatial direction. The STA loading information provides statistics representing the loading or usage of the STA to the whole channel across all directions. Spatial occupancy is an indication of usage of a specific direction for transmission or reception by the STA. STA occupancy is an indication that the channel is occupied by the STA across all directions. Spatial scheduling is the time scheduling information for the STA on this channel in a specific spatial direction. STA scheduling provides time scheduling information of the STA across all directions. If this STA is occupying more than one channel, then in at least one embodiment, the announcement is transmitted on selected channels, or on each channel regarding the channel it is transmitted on. It is also possible to transmit the announcement, with information about all channels occupied, on each channel or only on the primary channel.

7. Spatial Loading and Channel Loading

Loading information provides statistics representing the usage of the channel in a specific direction(s) or across all directions. These statistics can represent any performance metric than can be utilized by the other STAs receiving this announcement frame to determine the status of the channel or the spatial direction. It should be appreciated that the word "percent" or "percentage" as used in this disclosure pertains to any metric used which can indicate a relative amount, including fractions, expressing time used over a specified period of time, the number of operations over a given period or in relation to other activity, and other mechanisms for similarly expressing this statistical information.

Specific examples of spatial loading statistics, according to one or more embodiments include the following: (a) percentage of the time the channel is used for transmission in that direction; (b) percentage of time the channel is used for reception in that direction; and (c) percentage of time the channel is not used for transmission or reception in that direction.

Specific examples of channel loading statistics, according to one or more embodiments include the following: (a) percentage of time the channel is used for transmission across all directions; (b) percentage of time the channel is used for reception across all directions; (c) percentage of time the channel is not used for transmission or reception across all directions.

The STA can send one or more of the previously stated statistics in addition to other channel measured statistics as desired according to the specific implementation and application as would be known to one of ordinary skill in the art as based on this disclosure.

According to the protocol, STAs announce directional loading statistics to other STAs, however, according to at least one embodiment of the disclosure, the STAs maintain directional statistics for each direction and for each peer STAs as well. Maintaining this information allows updating the usage if a peer is turned off (inactive) or has departed (e.g., moved from one direction to another direction).

Figure 13:
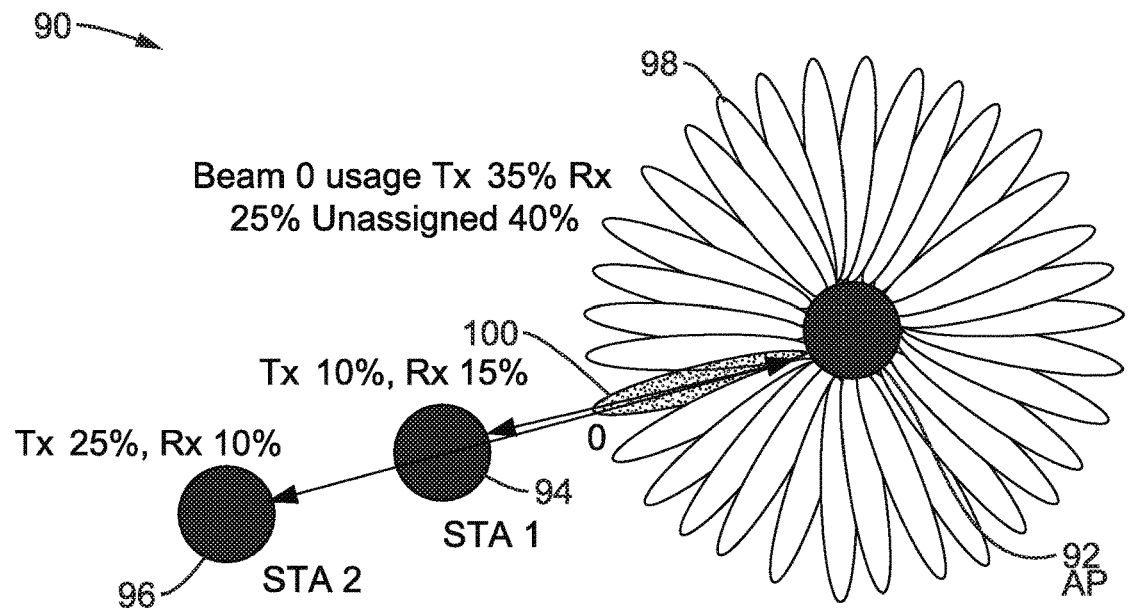
FIG. 13 is a directional beam diagram exemplifying two nearby peers served by one beacon as an example according to an embodiment of the present disclosure.
Figure 14:
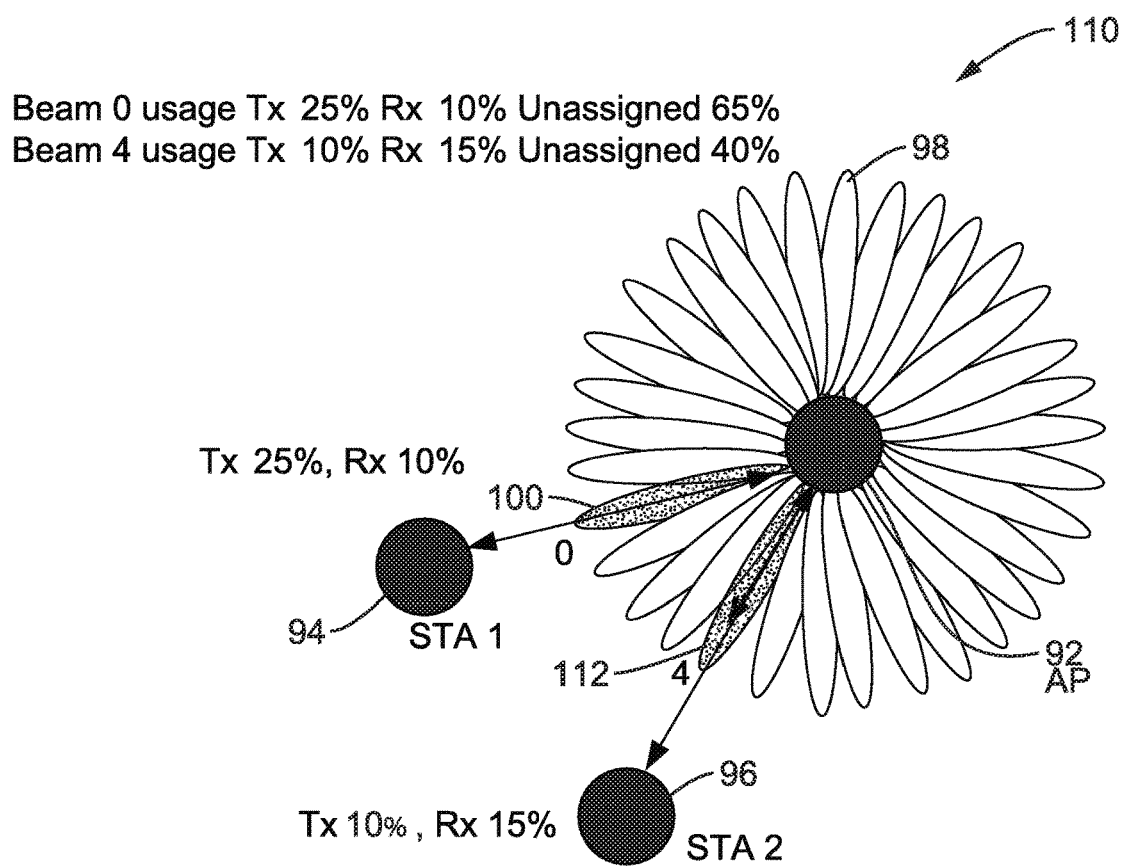
FIG. 14 is a directional beam diagram exemplifying the two peers of FIG. 13 after one peer has moved and is using a different directional beam as an example according to an embodiment of the present disclosure.

FIG. 13 and FIG. 14 illustrate an example embodiment 90, 110 showing different examples of spatial loading for AP 92. In FIG. 13 a station, depicted as an access point (AP) 92 is shown with directional sectors 98, and in particular communicating with STA 1 94 and STA 2 96 over a single beam 100 (beam direction 0). In this case one direction is serving two peer STAs (STA 1 and STA 2) and statistics for this direction are collected for each peer and the accumulated statistics are determined as well. In this example, the figure depicts that the use of directional beam 100 (Beam 0) is 35% Tx, 25% Rx and 40% unassigned, with STA 1 is seen performing 10% Tx and 15% Rx, while STA 2 is seen performing 25% Tx and 10% Rx.

In FIG. 14 one of the stations, in this case STA 2 96, has moved such that it is in a different beam direction in relation to AP 92. STA 2 is updated to being served by beam 112 (Beam direction 4), with the statistics of STA 2 moved to the new serving beam, and the usage statistics were updated to reflect STA 1 usage only. The figure depicts the new statistics at the AP with beam 100 (Beam direction 0) having usage of 25% Tx, 10% Rx and 65% unassigned, while beam 112 (Beam direction 4) has usage of 10% Tx, 15% Rx and 40% unassigned. STA 1 is using beam 100 with 25% Tx and 10% Rx, and STA 2 is using beam 112 with 10% Tx and 15% Rx.

Other embodiments of the protocol can be more simply implemented to update the statistic of the beam without carrying the peer statistics information to the new beam. In this implementation, once a peer STA is moving and switching to a new beam the old beam will still carry the old statistics and will require time to update and reflect the new current channel usage statistics. The new beam as well can carry the old statistics before STA 2 is switched or start with initial state and the statistics get updated over time.

The spatial loading statistics for each direction can be transmitted on its associated beam, and/or it can be broadcast with all directional statistics across all directional sectors (beams). The channel loading statistics can be transmitted on the directions where there are active channel usage, and/or it can be broadcast across all directional sectors (beams).

8. WLAN Implementation Examples

8.1. Channel Allocation and Allocation Loading

Time is allocated in WLAN to STAs as either a contention based access period (CBAP) or a service period (SP). CBAP can be open to all STAs in the BSS to access it using a contention protocol. CBAP can be also dedicated to a set of STAs or only one STA. The SP is assigned to a specific STA to use it, and thus comprises a non-contention access.

In at least one embodiment, the channel loading statistics are coupled to a specific allocation (time allocation) whether it is for one STA or multiple STAs. In the example case, the loading statistics are sent with the allocation itself, such as in the extended schedule element or the extended directional multi-gigabit (EDMG) extended schedule element for example.

In at least one embodiment, the spatial loading statistics can be coupled (tied) to a spatial direction within a specific allocation, whether it is for one STA or multiple STAs, as long as the STAs are in the same spatial direction.

Figure 15A:
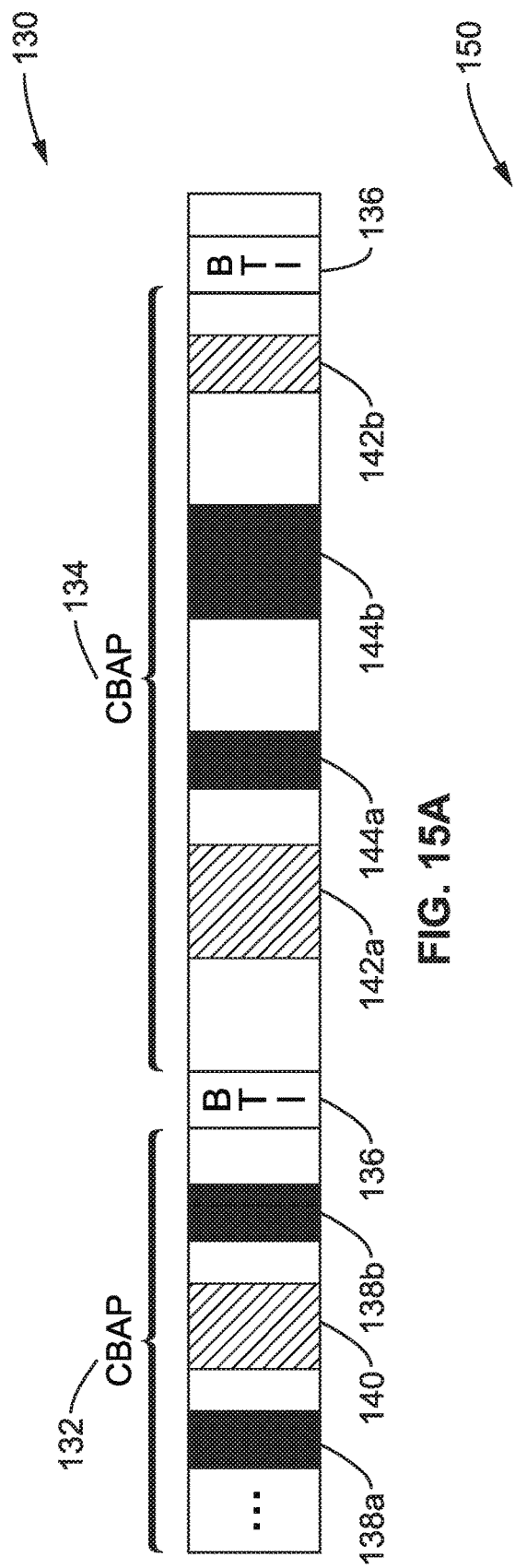
FIG. 15A and FIG. 15B are signaling and directional beam diagrams showing channel allocations and loading according to an embodiment of the present disclosure.
Figure 15B:
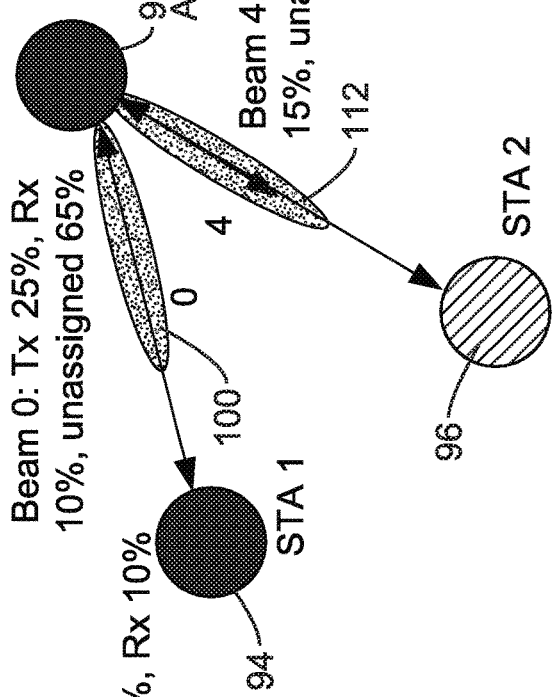

FIG. 15A and FIG. 15B illustrate an example embodiment 130, 150 of channel statistics under CBAP. In FIG. 15A is seen transmissions operating under CBAP showing two CBAP intervals 132, 134 between which is a BTI 136. The first CBAP interval 132 is shown with accesses 138a, 138b from STA 1, and 140 from STA 2. Similarly, the second CBAP interval 134 is shown with accesses 144a, 144b from STA 2, and 144a, 144b from STA 1. In FIG. 15B is seen the same STAs (nodes) as seen in FIG. 13 and FIG. 14, yet here with STA 1 and STA 2 shaded to match FIG. 15A accesses.

It should be appreciated that if the entire beacon interval is allocated to CBAP periods, where all STAs are allowed to access the channel using contention, then the channel loading statistics would determine the performance parameters measured across the whole time in all directions. For example, these loading statistics can comprise the percentage of time the STA is transmitting in any direction, the percentage of time the STA is receiving in any direction and the percentage of time the STA is unassigned to transmission or reception. In at least one embodiment the STA determines (calculates) the statistics for each peer and for each direction where activity (transmission or reception) is occurring. In at least one embodiment the STA can announce the channel statistics or each spatial direction statistics.

FIG. 16A and FIG. 16B illustrate another example embodiment 170,190 of channel statistics, but this time under SP. In FIG. 16A a transmission interval is seen with a first BTI 176 followed by an SP interval 172 shared 178 between STA 2 and STA 3 on beams 96, 192 from AP 92. Following the SP interval is a TDD-SP interval 174, utilized by STA 1 on beam 100 from the AP 92, before the next BTI 176.

In this example it is seen that if the time allocation is such that it is divided between two SPs, then the first SP is dedicated to one STA and the second SP is dedicated to multiple transmissions and receptions (TDD_SP for example). In this case the first SP has one spatial direction where the statistics are calculated and maintained in this direction. In the second SP, the STA calculates the statistic for each peer and for each direction where activity (transmission or reception) is occurring. Also the STA determines (calculates) the statistics of the second SP allocation across all active transmission or reception sectors. In at least one embodiment, the STA is also configured to determine (calculate) channel allocation statistics across both SPs.

8.2. Spatial and Channel Loading Statistics Fields

In order to send spatial and channel statistics the following field is used to relay information about collected transmission and reception statistics as well as unassigned time resources.

FIG. 17 illustrates an example embodiment 210 of a first spatial and channel loading statistics element (record) shown with fields: Tx Statistics, Rx Statistics, and Unassigned Statistics. The Tx Statistics field contains information about any of the measured transmitter statistics. By way of example and not limitation, the example is shown configured for using a byte of information, which allows a value from 0 to 255 into which the range of measured statistics are conveyed. It should be appreciated that the number of bits can be adjusted to reflect the required resolution for representing the statistics, or utilized in other formats, such as subfield formats as desired for conveying the statistics. For example if the Tx statistics represent the percentage of time the beam is used for transmission or the percentage of time the channel is used for transmission from any beam, 0 can represent 0% and 255 can represent 100%. In this example the values for Rx and Unassigned Statistics are similarly represented.

FIG. 18 illustrates an example embodiment 220 of spatial and loading statistics showing an element (record) containing the above fields along with a DMG Antenna ID field and a Beam ID field. The DMG antenna ID and the Beam ID represent references to the beam and antenna ID of the spatial direction where the statistics are collected.

In at least one embodiment the STA sending the loading field can determine (calculate) the statistics for a specific spatial direction or for the whole channel across all spatial directions. If the field is determined for a specific direction, then the STA sending the field determines statistics about all activity in that spatial direction in regards to all peer STAs connected to the STA through that direction. The STA sending that field keeps track of all activity in the spatial direction where statistics are collected and sent, and updates the statistics every time this field is sent.

If the field is determined for the channel (across all spatial directions), then the STA sending the field determines statistics about all activity across all spatial directions in regards to all peers connected to the STA across all directions. The STA sending that field tracks all activity in all spatial directions and updates the statistics every time this field is sent.

The STA adjusts the period over which the statistics is measured and updated. For example when the statistics measure the time used for transmission, reception and the unassigned time, then in at least one embodiment the STA uses a running average for the Tx, Rx and unassigned time allocations or otherwise determines the statistics based on a specific window size.

The STA receiving the statistics record is configured according to the disclosure to extract information about either the specific spatial direction or the channel loading across all spatial directions, depending on the element that the field is contained within. If the Antenna and beam ID are included in the frame, the STA can extract information about the transmission activity in that spatial direction (percentage of time the direction is used for transmission to other STAs for example), reception activity of the STA sending the field (percentage of time the direction is used for reception from other STAs for example) and statistics regarding the time when there is not activity on that direction (percentage of time the direction is not used for transmission or reception by the STA sending that field for example).

8.3. Loading Statistics Element

A loading statistics element is introduced which is configured for being sent with frames being broadcast in all directions through directional beams, or using a quasi-Omni antenna, transmitted through a different band, or otherwise conveyed to neighboring stations. By way of example and not limitation, the new element can be attached to the beacon in DMG beacon transmission.

Figure 20:
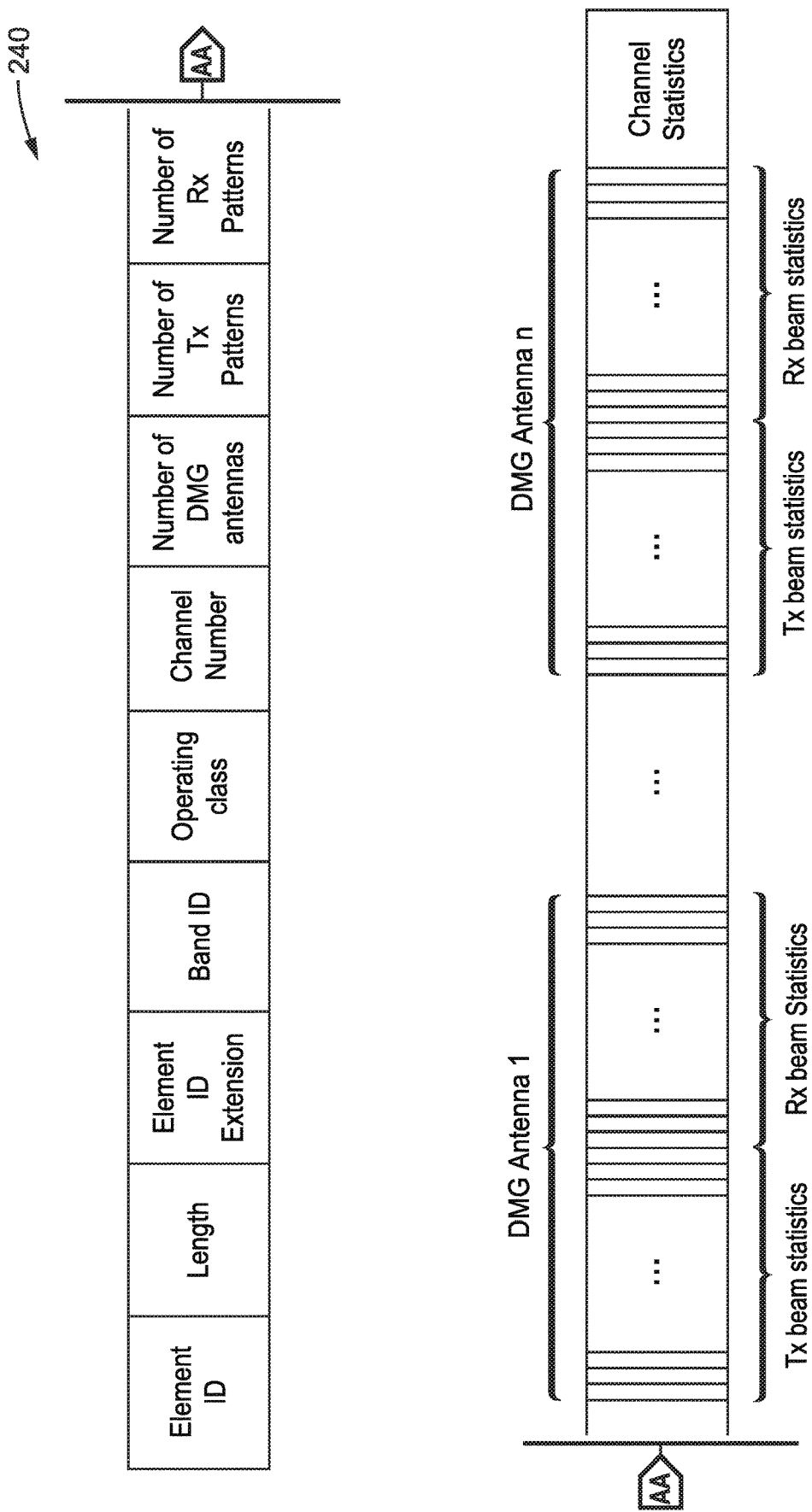
FIG. 20 is a data field diagram of another loading statistics element according to an embodiment of the present disclosure.

FIG. 19 and FIG. 20 illustrate example embodiments 230, 240 of loading statistics elements. In FIG. 19 element 230 contains the element ID, Length, Element ID extension fields which indicate the type of element and length of the element. The Band ID, Channel Number and Operating Class fields are used for indicating the channel for which statistics are determined. The number of spatial directions that are included in the element is indicated by the Number of Spatial Statistics field, and it determines the number of spatial loading statistics fields in the element. Each spatial loading statistics field contains the Tx, Rx, unassigned Statistics in addition to the Antenna and Beam ID for this spatial direction as was shown in FIG. 18.

In FIG. 20 the loading statistics element 240 contains the element ID, Length, Element ID extension fields which indicate the type of element and length of the element. The Band ID, Channel Number and Operating Class are used for indicating the channel for which statistics are determined. The element contains a map for all Tx beam and Rx beam statistics for each DMG antenna. The Number of DMG antenna fields indicates that number of Tx and Rx statistics fields in the element. The number of Tx beam patterns and the number of Rx beam patterns indicate the size of the Tx and Rx statistics for each DMG antenna. Each DMG antenna has Tx and Rx beam statistics that represent the Tx and Rx statistics of the beam ID related to this antenna ID. These statistics are helpful when the Tx and Rx beams are not symmetric and the STA is broadcasting all the statistics of all directions for Tx and Rx.

8.4. EDMG Extended Schedule and Spatial Statistic Information

FIG. 21 illustrates an example embodiment 250 of an EDMG Extended Schedule element which defines channel scheduling for an EDMG BSS, including indication of which channels an allocation is scheduled on. The element ID, Length, and Element ID extensions indicate the type of element and length of the element. The EDMG Allocation Control field contains control bits to the EDMG allocation process. The Number of Allocations field indicates the number of allocations in the element. Each of the Channel Allocation fields, of which there can be multiple, contain allocation information as described below.

FIG. 22 illustrates an example embodiment 260 of a Channel Allocation field. If the Scheduling type subfield is set to an active state (i.e., set to 1) it indicates that the channel allocation field contains the complete allocation information, otherwise it only contains supplemental information. The Channel Aggregation and BW subfields define the aggregation and bandwidth (BW) the allocation is using. The Asymmetric Beamforming, NSTS and Nmax STS subfields are used for configuring Asymmetric beamform training allocation if the Asymmetric Beamforming subfield is active (e.g., set to 1). The Receive Direction subfield indicates the receive antenna configuration that the PCP or AP uses during allocation. The Channel Statistics and Spatial Statistics subfields were defined as seen in FIG. 17 and FIG. 18. The allocation subfield contains the channel allocation details.

8.5. Broadcast Channel/Spatial Loading in Activity Direction

Each beacon transmitted in a given direction "i" contains the loading statistics field defined in FIG. 17 or FIG. 18. This field can be added to the beacon itself or included in one of the elements that is attached to the beacon, for example the extended schedule element, EDMG extended schedule element, TDD schedule element, TDD Structure element, BSS load element, the loading statistics element or any other element that is transmitted with the beacon.

FIG. 23 illustrates an example embodiment 270 showing beacon transmissions containing spatial statistics information. The process starts at block 272 and at block 274 it prepares beacon transmissions in direction "i". A check 276 is made to determine if active transmissions or receptions are being performed for direction "i". If there are active transmissions or receptions, then block 278 adds the spatial statistics related to this direction to the beacon, before block 280 is reached. Otherwise, if there are no active Tx or Rx found at block 276, then execution moves directly to block 280.

At block 280 channel statistics are added and the beacon is transmitted in the "i" direction. A check is made 282 if there are more beacons to be transmitted. If there are more beacons, then execution reaches block 284 to update the direction to a new direction and reach the top of the loop at block 274. Otherwise, if there are no more beacons to be transmitted, then the process ends 286.

FIG. 24A through FIG. 24C illustrate an example embodiment 280, 290, 300 of beacon frames transmitted. In FIG. 24A a beacon frame is configured for direction i, and is shown with spatial statistics for direction i, as well as channel loading statistics. In FIG. 24B there is shown a beacon frame configured for direction i+1 also having spatial statistics fields attached to it. In FIG. 24C is seen a beacon transmitted in direction i+2 which does not contain spatial statistics since there is no transmission or reception in this direction. It is also possible to have the spatial statistics field showing no transmission or reception in that direction. All transmitted beacons contain the channel statistics which represent the statistics of transmission and reception across all directions.

8.6. Broadcasting Loading of all Tx Beams Across all Directions

Each beacon transmitted in any direction i contains the spatial statistics field for all active transmissions across all directions. The beacon contains the antenna ID and beam ID of the Tx sector it is transmitted from which represents the spatial direction. Each of these fields refers to a specific spatial direction identified by the antenna ID and beam ID as described in FIG. 18. The receiving STA uses this information to determine if the intended direction of reception or transmission matches the statistics spatial direction which would indicate a possible interference. In addition, each beacon contains channel loading statistics. This represents the Tx, Rx and unassigned time statistics information across all directions FIG. 25 illustrates an example embodiment 310 of preparing and transmitting beacons with spatial statistics and channel statistics for all active Tx and Rx. The process starts 312 and at block 314 a list is prepared of "n" active spatial directions in which a STA is communicating with peer STAs. A check is made 316 if there are any active spatial directions. If there are active spatial directions, then at block 318 the spatial statistics for this direction are added to the beacon, then the "n" direction counter is moved (e.g., decremented n=n−1) to the next direction in the list before returning to block 316. If there are no active directions found at block 316, either at the beginning or after completing processing to the "n" directions, then execution reaches block 322 which adds the prepared fields and channel statistics and then transmits the beacon in direction "I". A check is made 324 to determine if there are more beacons to be transmitted. If there are more beacons, then block 326 is reached which updates the direction "I" and returns to block 322. Otherwise, when there are no more beacons to be transmitted, then the process ends 328.

FIG. 26A and FIG. 26B illustrate an example embodiment 330, 340 showing fields for all spatial directions which are added to each beacon transmitted. In FIG. 26A the beacon frame is seen for direction i, while in FIG. 26B the beacon frame is seen for direction i+1. The beacon frames are shown with spatial statistics for direction 1 on through to direction n, along with channel loading statistics.

8.7. Broadcast EDMG Allocation Info w/Tx-Rx Directions

The EDMG extended schedule element is transmitted with the beacon that contains allocation information for SPs and CBAP allocations. Each allocation indicates that one or more STAs might access the allocation in one or more spatial directions. The STA may transmit the spatial statistics in each Channel Allocation field if one spatial direction is used. The STA can also transmit the channel loading statistics if one or more STA is using this allocation. The EDMG extended schedule element is utilized according to at least one embodiment of the disclosure to carry loading statistic fields for the specific spatial direction that the frame is sent to, or for the channel as was previously described.

8.8. Broadcasting Spatial Loading Statistics Element

FIG. 27 illustrates an example embodiment 350 for transmitting beacons with the spatial loading statistics element. According to at least one embodiment, each DMG beacon transmitted carries the spatial loading statistics element. The spatial loading statistics element is prepared as the STA goes through reviewing all active communications with other peer STAs and calculate the statistics for each active spatial direction. The STA calculates the statistics for each spatial direction and populates the element with the spatial direction statistics as described in a previous section. The STA calculates as well the channel statistics across all directions and adds it to the element.

In FIG. 27 processing commences 352 and in block 354 a list of "n" active peer communications are prepared. In block 356 the previously determined spatial directions are allocated. A check is made 358 if there are any active peers (or any more active peers). If active peers are found then a loop is started with updating 360 the spatial direction where there is active Tx or Rx, followed by moving 362 the active peer counter to the next location (e.g., n=n-1) before returning to the check at block 358.

Otherwise, if there is no, or no remaining, active peers then execution reaches block 364 which updates channel statistics and prepares the spatial loading statistics element before reaching block 366 which adds the prepare information element (IE) to the beacon and transmits the beacon in direction "i". A check is made 368 for more beacons to be transmitted. If there are more beacons to send, then the direction counter is updated 370 and a return to block 366 to add the IE to another beacon. Otherwise, if all beacons are sent, execution ends 372.

8.9. Blocked Spatial Channel Determination Through Receive Antenna Beamforming

A STA receiving a beacon with spatial directional information is informed about the existence of a potential interference. Since the sensing is usually performed using a quasi-Omni directional antenna, it is not known which direction, or directions, are impacted by this interferer (interfering station). A STA detecting a potential interference is configured according to the disclosure so that it can trigger beamforming to determine the direction of the potential interferer, and not for the purpose of beamforming to setup a link or to authenticate/associate with the discovered node. Beamforming is triggered based on the type of channel access the discovered STA is using, TDD beamforming or regular beamforming.

In at least one embodiment, the Rx beamforming is performed by sending TRN fields (Training fields) with the beacon or the SSW frames, which aids the STA in finding an interference direction without the need to communicate with the other STA. After the STA finishes the receive antenna beamforming with the interferer, then the STA can determine the directions the interference is coming from and take that into account when accessing the spectrum in these directions. According to the disclosed protocol, the STA obtains statistics about how the interferer is using the spatial direction where the interference is arising from. The STA can determine based on the value of the received statistics where this direction is blocked, and determine if it can still access the channel from this direction. The STA can utilize the receiver antenna beamforming to block channel access in that spatial direction. The STA according to the disclosure, however, may utilize the channel in other spatial directions other that those affected by the interferer.

FIG. 28A through FIG. 28C illustrate an example embodiment 390, 410, 420 of a case in which a STA receives a beacon with allocation and directional information. The STA starts beamforming with the discovered interferer and then determines the direction of the interferer.

In particular, FIG. 28 depicts STA A 392, STA B 394 and STA C 396. Active Tx/Rx is occurring 398 between STA B and STA C. STA B is transmitting 400 a beacon with the loading statistics information. STA A receives 402 the beacon with the quasi-Omni antenna. In FIG. 28B STA A performs beamforming 412 to detect the direction of the interference. In FIG. 28C STA A detects 422 the direction of the interferer.

9. Action Taken by STAs Outside the BSS

If the announcement carries the scheduling information, the STA can obtain information about the scheduled transmission in the channel as well. According to the disclosure, in response to the information available and/or being provided, the STA can make a number of selections. For example the STA can select whether it should perform receiver beamforming with the interferer to find out the direction where the interference is coming from if the interferer is supporting this option. STAs receiving the announcement from other STAs in this area can decide on many actions depending on the situation and the information contained in the announcement. The STA can decide to switch channels and scan another channel that is less congested. The STA can also try to access the channel if it found that the channel is not congested, or is lightly scheduled, and the STA might have an opportunity to access the channel. The STA can determine the time periods the channel is unassigned or used in the Rx direction and try to access the channel at that time. The STAs can access the channel if the channel is lightly scheduled in its direction. The STA can find the direction where interference is expected and access the channel in a different direction.

FIG. 29A through FIG. 29B illustrate an example embodiment 430 of a flow chart for a STA receiving the statistics of other channels before accessing the channel.

Processing commences in FIG. 29A in block 432 followed by a check 434 to determine if statistics were received from other stations. If no statistics were received, then the process will be executed later when they arrive. Otherwise, a check is made at block 436 to determine if the received statistics indicate a CBAP access period. If it is not a CBAP access period, then block 440 is reached.

If it is a CBAP access period then a check is made at block 438 to determine if the station is willing to share the channel. If the channel is to be shared, then execution reaches block 456 in FIG. 29B which accesses the channel before ending 460 the process. Otherwise, if the channel is not to be shared, then block 440 is reached.

At block 440 a check is made to determine whether the channel statistics indicate the extent to which the channel has been scheduled, and in particular if the channel is either free or lightly loaded. If the channel is lightly loaded, then execution reaches block 456 in FIG. 29B which accesses the channel before ending 460 the process. Otherwise, if this channel is not free or lightly loaded, then a check is made at block 442 to determine if the station is multi-channel and willing to switch channels. If this station is willing to switch channels, then block 444 is executed which switches channels and tries to scan/access the new channel, then execution moves to the start of the process at block 434. Otherwise, if this channel lacks multi-channel capability or is not willing to switch channels, then execution reaches block 446 in FIG. 29B which checks if allocation information is available. If allocation information is not available, then block 452 is reached.

If allocation information is available, then at block 448 the channel is accessed at a time when it is otherwise unassigned or in the receive direction. Then a check is made 450 to determine if more resources are necessary. If more resources are not needed, then block 456 is reached which accesses the channel before ending 460.

If more resources are found to be needed at block 450, then block 452 is reached which allocates a channel in the direction of the detected interference by the receiver beamforming. A check is then made 454, to determine whether the channel is free or lightly scheduled (loaded) in the intended communications direction. If the channel is free or lightly loaded, then the channel is accessed at block 456 before ending the process 460. Otherwise, if the channel is not free or lightly loaded, then block 458 is reached which indicates the channel is busy and might be blocked if accessed, so the channel is not accessed and the process ends 460.

10. Multi-Band Operation

STAs listening for beacons of other STAs around them can miss these beacons if the STA is using an Omni-antenna for reception. The beacon might not be received and the STA will not be aware of the other activity in the channel.

FIG. 30 illustrates an example embodiment 430 showing a situation arising between STA A 472, STA B 474, STA C 476, and STA D 478. In this example STA A is not capable 486 of receiving the beacon 482 transmitted on the 60 GHZ band with the loading statistics of the channel, because there is not enough link budget. STA B is transmitting a beacon with the statistics of the channel due to STA B and STA C communication 480. STA A is collecting these statistics to schedule allocation, access the channel or form an intended link 484 with STA D.

If the wireless device is equipped with multi-band operation (mmW band and sub-6 GHz band for example), the node can send the mmW band spatial loading statistics information over the sub-6 GHz band. A loading statistics element as previous described can be transmitted over the sub-6 GHz map to indicate the statistics of each spatial direction used on the mmW band. This information can be broadcast with the sub-6 GHz beacon with an indication that this relates to other bands and channels and indicating which is the associated band and channel of concern.

FIG. 31 illustrates an example embodiment 490 having the same stations seen in FIG. 30. In this case STA B is now sending a beacon 494 as an Omni-directional transmission on the sub-6 GHz band, in which the beacon contains a multi-band element and channel loading statistics element to inform other STAs about the activity on the directional mmW band. STA A receives 496 the beacon over the sub-6 GHz band using Omni-directional antenna. The information allows STA A to now establish its intended communication 492 with STA D.

FIG. 32 illustrates an example embodiment 510 of an exchange of frames on the sub-6 GHz band and interactions between STA A mmW 512, STA A Sub-6 GHz 514, STA B Sub-6 GHz 516, and STA B mmW 518. Active transmissions and receptions 520 are taking place on the directional mmW band between STA B and STA A. The double headed arrows depict active transmission and reception on the mmW band. The upper two arrows show STA B active on mmW band and that the range might not reach to STA A. The lower double headed arrow shows active mmW TX and RX after communicating channel usage statistics on the sub 6-GHz band. A beacon is transmitted 522 from STA B sub 6-GHz band to STA A sub 6-GHz band. Then an MLME is performed 524 to provide information on channel statistics and loading parameters needed for mmW operations. STA A then decides 526 on which channel and how to access the mmW channel.

The mmW spatial and channel loading statistics can also be requested over the sub-6 GHz band and the node receiving this request can respond by spatial loading statistics and channel loading statistics for the band and channel requested as described below.

FIG. 33 illustrates an example embodiment 530 of an exchange of frames on the sub-6 GHz band and interactions between the stations which were seen in FIG. 32. Active transmissions and receptions 532 are taking place on the directional mmW band between STA B and STA A. A beacon is transmitted 534 from STA B sub 6-GHz band to STA A sub 6-GHz band. Then STA A sends an mmW channel loading statistics element 536 request to STA B, to which STA B responds 538. Then STA A performs an MLME 540 to provide information on channel statistics and loading parameters needed for mmW operations. STA A then decides 542 on which channel and how to access the mmW channel.

11. Summary of Disclosure Elements

The following summary discloses certain important elements of the instant disclosure, however the summary is not to be construed as describing the only important elements of the disclosure.

According to the disclosed protocol, method and/or apparatus, stations (STAs) announce channel use statistics about specific directions and/or across all directions to other STAs. This information may be incorporated within other broadcasts, such as integrated with network discovery signals, for example in DMG beacons or announcement frames.

This announcement information can be broadcast in a number of different ways, including but not limited to the following. Broadcasting can be performed of channel statistics information for each scheduled allocation within the EDGM extended schedule element. Broadcasting can be performed of spatial direction statistics in the direction where the carrying frame is sent, which for example can be added to the extended schedule element allocation field or any other element. Broadcasting can be performed of a spatial loading statistics element that contains the statistics of the spatial loading in all directions and the channel loading statistics across all directions.

In at least one embodiment, STAs transmit at least this announcement frame (DMG beacon for example) in the direction of transmission or reception. The beacon contain spatial and channel loading statistics information. Other STAs receiving the DMG beacons thus obtain information about the loading of the channel or the loading of a specific spatial direction in the channel.

STAs can perform receiver (Rx) beamforming with the received beacon if it is indicating interference in its direction. In at least one embodiment, this is accomplished through the use of additional training fields sent attached to the beacon or other beamforming techniques. A STA can thus determine channel occupancy in a direction in which another STA is active. If the first STA is accessing the channel through the same spatial direction as a second STA, then the first STA decides depending on the received information if it can access this spatial direction.

STAs can utilize the disclosed Rx beamforming information to identify channel usage directions and congestion. If the sensed channel usage turns out to be from a direction other than the intended direction of access, the STA can access the channel.

A STA can send the allocation and the directional information by one of a number of methods, including but not limited to the following embodiments. Sending allocation and directional information by broadcasting channel and spatial loading of the Tx beam in the direction of transmission or reception. Sending allocation and directional information by broadcasting channel and spatial loading of the Tx beam in all directions. Sending allocation and directional information by broadcasting the EDMG extended schedule allocation information with transmit and receive statistics information for spatial directions and channels. Sending allocation and directional information by broadcasting the spatial loading information element in all directions.

12. General Scope of Embodiments

The enhancements described in the presented technology can be readily implemented within the protocols (e.g., programming executing on the processor of the station) of various wireless communication stations. It should also be appreciated that wireless communication stations are preferably implemented to include one or more computer processor devices (e.g., CPU, microprocessor, microcontroller, computer enabled ASIC, etc.) and associated memory storing instructions (e.g., RAM, DRAM, NVRAM, FLASH, computer readable media, etc.) whereby programming (instructions) stored in the memory are executed on the processor to perform the steps of the various process methods described herein.

The computer and memory devices were not depicted in every one of the diagrams for the sake of simplicity of illustration, as one of ordinary skill in the art recognizes the use of computer devices for carrying out steps involved with controlling a wireless communication station. The presented technology is non-limiting with regard to memory and computer-readable media, insofar as these are non-transitory, and thus not constituting a transitory electronic signal.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple embodiments which include, but are not limited to, the following:

1. An apparatus for wireless communication in a network, comprising: (a) a wireless communication circuit configured as a station for wirelessly communicating with at least one other station, using directional communications; (b) a processor coupled to said wireless communication circuit within a station configured for operating on a wireless network; (c) a non-transitory memory storing instructions executable by the processor; and (d) wherein said instructions, when executed by the processor, perform steps comprising: (d)(i) performing sector level sweep operations over different antenna sectors between stations for selecting one or more sectors over which communication between the station and an other station is to be performed; (d)(ii) performing directional communications with the other station over said one or sectors; (d)(iii) transmitting announcements containing channel usage statistics for specific directions as spatial loading statistics, or across all directions of communications as channel loading statistics; and (d)(iv) wherein said announcements are transmitted by appending them within frames of other transmissions being performed, or frames generated to contain the announcements.

2. A method of performing wireless communication in a network, comprising: (a) performing sector level sweep operations by a wireless communication circuit configured as a station, over different antenna sectors between stations on a wireless network for selecting one or more sectors over which communication between the station and another station is to be performed; (b) performing directional communications with the other station over said one or sectors; (c) transmitting announcements containing channel usage statistics for specific directions as spatial loading statistics, or across all directions of communications as channel loading statistics; and (d) wherein said announcements are transmitted by appending them within frames of other transmissions being performed, or frames generated to contain the announcements.

3. The apparatus or method of any preceding embodiment, wherein said instructions when executed by the processor perform transmitting said announcements utilizing directional communications, Omni-directional communications or a combination of directional and Omni-directional communications.

4. The apparatus or method of any preceding embodiment, wherein said instructions when executed by the processor perform transmitting said announcements in which said spatial loading statistics comprises: (a) percentage of time channel is used for transmission in that direction, (b) percentage of time channel is used for reception in that direction, and (c) percentage of time channel is not used for transmission or reception in that direction.

5. The apparatus or method of any preceding embodiment, wherein said instructions when executed by the processor perform transmitting said announcements in which said channel loading statistics comprises: (a) percentage of time the channel is used for transmission in across all directions, (b) percentage of time the channel is used for reception across all directions, and (c) percentage of time the channel is not used for transmission or reception across all directions.

6. The apparatus or method of any preceding embodiment, wherein said instructions when executed by the processor perform transmitting said announcements in the direction by which transmissions are being sent, or in the direction from which transmissions are being received, or a combination of in the direction transmissions are being sent and transmissions are being received.

7. The apparatus or method of any preceding embodiment, wherein said instructions when executed by the processor perform transmitting said announcements by broadcasting a network discovery message incorporating the spatial loading or channel loading information.

8. The apparatus or method of any preceding embodiment, wherein said instructions when executed by the processor perform transmitting said announcements as channel loading statistics for each scheduled allocation within each extended directional multi-gigabit schedule element.

9. The apparatus or method of any preceding embodiment, wherein said instructions when executed by the processor perform transmitting said announcements in the direction in which a carrying frame is sent.

10. The apparatus or method of any preceding embodiment, wherein said instructions when executed by the processor perform transmitting said announcements by adding them to an extended schedule element allocation field.

11. The apparatus or method of any preceding embodiment, wherein said instructions when executed by the processor perform transmitting said announcements by incorporating a statistics element containing spatial loading statistics or channel loading statistics into a frame being transmitted.

12. The apparatus or method of any preceding embodiment, wherein said instructions when executed by the processor perform responding to receiving said announcements by performing receiver beamforming with another station to receive announcements which determine channel usage of a sector direction and whether the station can utilize the sector direction for communications.

As used herein, the singular terms "a," "an," and "the" may include plural referents unless the context clearly dictates otherwise. Reference to an object in the singular is not intended to mean "one and only one" unless explicitly so stated, but rather "one or more."

As used herein, the term "set" refers to a collection of one or more objects. Thus, for example, a set of objects can include a single object or multiple objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An apparatus for wireless communication in a network, comprising:
   (a) a wireless communication circuit configured as a station for wirelessly communicating with at least one other station, using directional communications;
   (b) a processor coupled to said wireless communication circuit within a station configured for operating on a wireless network;
   (c) a non-transitory memory storing instructions executable by the processor; and
   (d) wherein said instructions, when executed by the processor, perform steps comprising:
      (i) performing sector level sweep operations over different antenna sectors between stations for selecting one or more sectors over which communication between the station and an other station is to be performed;
      (ii) performing directional communications with the other station over said one or sectors;
      (iii) transmitting announcements, in the direction of transmission or reception, containing spatial occupancy and time occupancy information in each direction for stations to maintain directional statistics for each direction and for each peer station and for updating directional communications when a peer is turned off or otherwise becomes inactive, or has either departed or moved from one direction to another communication direction; and
      (iv) wherein said announcements include indicating the number of spatial directions which determines the number of spatial loading statistics fields contained in the announcement and are transmitted by appending them within frames of other transmissions being performed, or frames generated to contain the announcements.

2. The apparatus of claim 1, wherein said instructions when executed by the processor perform transmitting said announcements utilizing directional communications, Omni-directional communications or a combination of directional and Omni-directional communications.

3. The apparatus of claim 1, wherein said instructions when executed by the processor perform transmitting said announcements in which said spatial loading statistics comprises: (a) percentage of time channel is used for transmission in that direction, (b) percentage of time channel is used for reception in that direction, and (c) percentage of time channel is not used for transmission or reception in that direction.

4. The apparatus of claim 1, wherein said instructions when executed by the processor perform transmitting said announcements in which said channel loading statistics comprises: (a) percentage of time the channel is used for transmission in across all directions, (b) percentage of time the channel is used for reception across all directions, and (c) percentage of time the channel is not used for transmission or reception across all directions.

5. The apparatus of claim 1, wherein said instructions when executed by the processor perform transmitting said announcements in the direction by which transmissions are being sent, or in the direction from which transmissions are being received, or a combination of in the direction transmissions are being sent and transmissions are being received.

6. The apparatus of claim 1, wherein said instructions when executed by the processor perform transmitting said announcements by broadcasting a network discovery message incorporating the spatial loading or channel loading information.

7. The apparatus of claim 1, wherein said instructions when executed by the processor perform transmitting said announcements as channel loading statistics for each scheduled allocation within each extended directional multi-gigabit schedule element.

8. The apparatus of claim 1, wherein said instructions when executed by the processor perform transmitting said announcements in the direction in which a carrying frame is sent.

9. The apparatus of claim 8, wherein said instructions when executed by the processor perform transmitting said announcements by adding them to an extended schedule element allocation field.

10. The apparatus of claim 1, wherein said instructions when executed by the processor perform transmitting said announcements by incorporating a statistics element containing spatial loading statistics or channel loading statistics into a frame being transmitted.

11. The apparatus of claim 1, wherein said instructions when executed by the processor perform responding to receiving said announcements by performing receiver beamforming with another station to receive announcements which determine channel usage of a sector direction and whether the station can utilize the sector direction for communications.

12. The apparatus of claim 1, wherein each spatial loading statistics field contains the transmitter statistics, receiver statistics, and unassigned statistics with the antenna and beam identification for each of these spatial directions, thus providing a map for all transmit and receive beam statistics for each antenna direction.

13. An apparatus for wireless communication in a network, comprising:
   (a) a wireless communication circuit configured as a station for wirelessly communicating with at least one other station, using directional communications;
   (b) a processor coupled to said wireless communication circuit within a station configured for operating on a wireless network;
   (c) a non-transitory memory storing instructions executable by the processor; and
   (d) wherein said instructions, when executed by the processor, perform steps comprising:
      (i) performing sector level sweep operations over different antenna sectors between stations for selecting one or more sectors over which communication between the station and an other station is to be performed;
      (ii) performing directional communications with the other station over said one or sectors;
      (iii) transmitting announcements, in the direction of transmission or reception, containing spatial occupancy and time occupancy information in each direction for stations to maintain directional statistics for each direction and for each peer station and for updating directional communications when a peer is turned off or otherwise becomes inactive, or has either departed or moved from one direction to another communication direction;
      (iv) wherein said spatial loading statistics comprise: (a) percentage of time channel is used for transmission in that direction, (b) percentage of time channel is used for reception in that direction, and (c) percentage of time channel is not used for transmission or reception in that direction;

(v) wherein said channel loading statistics comprises: (a) percentage of time the channel is used for transmission in across all directions, (b) percentage of time the channel is used for reception across all directions, and (c) percentage of time the channel is not used for transmission or reception across all directions; and (vi) wherein said announcements include indicating the number of spatial directions which determines the number of spatial loading statistics fields contained in the announcement and are transmitted by appending them within frames of other transmissions being performed, or frames generated to contain the announcements.

14. The apparatus of claim 13, wherein said instructions when executed by the processor perform transmitting said announcements utilizing directional communications, Omni-directional communications or a combination of directional and Omni-directional communications.

15. The apparatus of claim 13, wherein said instructions when executed by the processor perform transmitting said announcements in the direction by which transmissions are being sent, or in the direction from which transmissions are being received, or a combination of in the direction transmissions are being sent and transmissions are being received.

16. The apparatus of claim 13, wherein said instructions when executed by the processor perform transmitting said announcements by broadcasting a network discovery message incorporating the spatial loading or channel loading information.

17. The apparatus of claim 13, wherein said instructions when executed by the processor perform transmitting said announcements as channel loading statistics for each scheduled allocation within each extended directional multi-gigabit schedule element.

18. The apparatus of claim 13, wherein said instructions when executed by the processor perform transmitting said announcements in the direction in which a carrying frame is sent, or by adding them to an extended schedule element allocation field.

19. The apparatus of claim 13, wherein said instructions when executed by the processor perform transmitting said announcements by incorporating a statistics element containing spatial loading statistics or channel loading statistics into a frame being transmitted.

20. The apparatus of claim 13, wherein said instructions when executed by the processor perform responding to receiving said announcements by performing receiver beamforming with another station to receive announcements which determine channel usage of a sector direction and whether the station can utilize the sector direction for communications.

21. The apparatus of claim 13, wherein each spatial loading statistics field contains the transmitter statistics, receiver statistics, and unassigned statistics with the antenna and beam identification for each of these spatial directions, thus providing a map for all transmit and receive beam statistics for each antenna direction.

22. A method of performing wireless communication in a network, comprising:

(a) performing sector level sweep operations by a wireless communication circuit configured as a station, over different antenna sectors between stations on a wireless network for selecting one or more sectors over which communication between the station and another station is to be performed;

(b) performing directional communications with the other station over said one or sectors;

(c) transmitting announcements, in the direction of transmission or reception, containing spatial occupancy and time occupancy information in each direction for stations to maintain directional statistics for each direction and for each peer station and for updating directional communications when a peer is turned off or otherwise becomes inactive, or has either departed or moved from one direction to another communication direction; and (d) wherein said announcements include indicating the number of spatial directions which determines the number of spatial loading statistics fields contained in the announcement and are transmitted by appending them within frames of other transmissions being performed, or frames generated to contain the announcements.

23. The method of claim 22, wherein each spatial loading statistics field contains the transmitter statistics, receiver statistics, and unassigned statistics with the antenna and beam identification for each of these spatial directions, thus providing a map for all transmit and receive beam statistics for each antenna direction.

* * * * *